(12) United States Patent
He et al.

(10) Patent No.: US 12,196,933 B2
(45) Date of Patent: Jan. 14, 2025

(54) ZOOM LENS

(71) Applicant: Dongguan Yutong Optical Technology Co., Ltd., Dongguan (CN)

(72) Inventors: Jianwei He, Dongguan (CN); Pinguang Zhang, Dongguan (CN); Zhanjun Zhang, Dongguan (CN)

(73) Assignee: Dongguan Yutong Optical Technology Co., Ltd., Dongguan (CN)

( * ) Notice: Subject to any disclaimer, the term of this patent is extended or adjusted under 35 U.S.C. 154(b) by 201 days.

(21) Appl. No.: 17/887,839

(22) Filed: Aug. 15, 2022

(65) Prior Publication Data

US 2023/0204932 A1 Jun. 29, 2023

(30) Foreign Application Priority Data

Dec. 24, 2021 (CN) .......................... 202111598349.6

(51) Int. Cl.
*G02B 15/14* (2006.01)
*G02B 13/18* (2006.01)
(52) U.S. Cl.
CPC ...... *G02B 15/144113* (2019.08); *G02B 13/18* (2013.01)
(58) Field of Classification Search
CPC ............................................ G02B 15/144113
USPC ......................................................... 359/687
See application file for complete search history.

(56) References Cited

U.S. PATENT DOCUMENTS

| | | | | |
|---|---|---|---|---|
| 2007/0273979 | A1* | 11/2007 | Kawakami | G02B 15/144513 359/686 |
| 2010/0290131 | A1* | 11/2010 | Muramatsu | G02B 27/646 359/687 |
| 2011/0164325 | A1* | 7/2011 | Arakawa | G02B 15/144113 359/687 |
| 2015/0168696 | A1* | 6/2015 | Iwasawa | G02B 15/144113 359/683 |

(Continued)

FOREIGN PATENT DOCUMENTS

| CN | 101153956 A | 4/2008 |
|---|---|---|
| CN | 101295070 A | 10/2008 |

(Continued)

OTHER PUBLICATIONS

Taiwanese Office Action with dated Feb. 6, 2023 for Taiwanese Patent Application No. 111128828.

(Continued)

*Primary Examiner* — Darryl J Collins
(74) *Attorney, Agent, or Firm* — McCarter & English, LLP

(57) ABSTRACT

Provided is a zoom lens. The zoom lens includes a fixed lens group having a positive optical power, a first zoom lens group having a negative optical power, a second zoom lens group having a positive optical power, and a compensation lens group having a positive optical power which are sequentially arranged along an optical axis from an object side to an image side, where the first zoom lens group and the second zoom lens group are capable of reciprocating along the optical axis. The fixed lens group includes a first lens, and the first zoom lens group includes a second lens, a third lens, and a fourth lens which are sequentially arranged along the optical axis from the object side to the image side.

8 Claims, 15 Drawing Sheets

(56) References Cited

U.S. PATENT DOCUMENTS

| | | | |
|---|---|---|---|
| 2016/0109692 A1* | 4/2016 | Shibata | G02B 15/145121 |
| | | | 359/557 |
| 2020/0233190 A1 | 7/2020 | Suzuki et al. | |
| 2020/0379223 A1* | 12/2020 | Tomioka | G02B 15/15 |
| 2022/0236543 A1* | 7/2022 | Ikeda | G02B 15/145127 |

FOREIGN PATENT DOCUMENTS

| | | |
|---|---|---|
| CN | 101566723 A | 10/2009 |
| CN | 101598848 A | 12/2009 |
| CN | 102636866 A | 8/2012 |
| CN | 107957622 A | 4/2018 |
| CN | 110488473 A | 11/2019 |
| JP | 2008281175 A | 11/2008 |
| TW | 201608274 A | 3/2016 |

OTHER PUBLICATIONS

PCT International Search Report dated Feb. 13, 2023 for PCT International Application No. PCT/CN2022/135045.

* cited by examiner

© ZOOM LENS

CROSS-REFERENCE TO RELATED APPLICATION(S)

This application claims priority to Chinese Patent Application No. 202111598349.6 filed Dec. 24, 2021, the disclosure of which is incorporated herein by reference in its entirety.

TECHNICAL FIELD

The present disclosure relates to the technical field of lenses and, in particular, to a zoom lens.

BACKGROUND

Zoom lenses are applicable to various surveillance scenarios due to their variable focal lengths, and become increasingly popular in the security and surveillance market. The zoom lenses may be classified into zoom lenses with constant apertures and zoom lenses with variable apertures according to the type of aperture, and may be classified into wide-angle zoom lenses and telephoto zoom lenses according to the angle. In the related art, a zoom lens with a constant aperture typically has a maximum angle of less than 76°, resulting in an insufficient surveillance range. However, an ultra wide-angle zoom lens with a maximum angle of more than 130° has a relatively large aperture difference between different focal length ranges, which makes image brightness in the different focal length ranges significantly different.

In recent years, the concepts of extra-large apertures and starlight are gradually recognized in the field of security. In the era of networking and digitization, the pursuit of high-definition surveillance makes a camera have higher and higher requirements for luminous flux. Generally, the higher the luminous flux, the better the low-light performance and the higher the signal-to-noise ratio, making the imaging effect better. However, in an completely dark environment, infrared light compensation is still necessary for imaging. Therefore, the lens is required to have an infrared confocal capability. However, a lens having the technical parameters of ultra-wide-angle zoom, a nearly constant aperture, and an infrared confocal capability of F1.0 is not yet available in the market.

SUMMARY

The present disclosure provides a zoom lens having an ultra wide angle, a constant large aperture (F1.0-F1.2), and an infrared confocal capability in all focal length ranges.

The present disclosure provides a zoom lens. The zoom lens includes a fixed lens group having a positive optical power, a first zoom lens group having a negative optical power, a second zoom lens group having a positive optical power, and a compensation lens group having a positive optical power which are sequentially arranged along an optical axis from an object side to an image side, where the first zoom lens group and the second zoom lens group are capable of reciprocating along the optical axis.

The fixed lens group includes a first lens, the first zoom lens group includes a second lens, a third lens, and a fourth lens which are sequentially arranged along the optical axis from the object side to the image side, the second zoom lens group includes a fifth lens, a sixth lens, a seventh lens, an eighth lens, a ninth lens, a tenth lens, and an eleventh lens which are sequentially arranged along the optical axis from the object side to the image side, and the compensation lens group includes a twelfth lens, a thirteenth lens, and a fourteenth lens which are sequentially arranged along the optical axis from the object side to the image side.

In an embodiment, an optical power G of the fixed lens group and an optical power B of the compensation lens group satisfy the following condition: $0.2 \le |G/B| \le 2.5$.

An optical power Z1 of the first zoom lens group and the optical power B of the compensation lens group satisfy the following condition: $3 \le |Z1/B| \le 30$.

An optical power Z2 of the second zoom lens group and the optical power B of the compensation lens group satisfy the following condition: $2 \le |Z2/B| \le 25$.

In an embodiment, the first lens has a positive optical power, the second lens has a negative optical power, the third lens has a negative optical power, the fourth lens has a positive optical power, the fifth lens has a positive optical power, the sixth lens has a negative optical power, the seventh lens has a negative optical power, the eighth lens has a positive optical power, the ninth lens has a negative optical power, the tenth lens has a positive optical power, the eleventh lens has a negative optical power, the twelfth lens has a positive optical power, the thirteenth lens has a positive optical power, and the fourteenth lens has a negative optical power.

In an embodiment, $\varphi 2$ represents an optical power of the second lens, $\varphi 3$ represents an optical power of the third lens, $\varphi 4$ represents an optical power of the fourth lens, $\varphi 5$ represents an optical power of the fifth lens, $\varphi 6$ represents an optical power of the sixth lens, $\varphi 7$ represents an optical power of the seventh lens, $\varphi 8$ represents an optical power of the eighth lens, $\varphi 9$ represents an optical power of the ninth lens, $\varphi 10$ represents an optical power of the tenth lens, $\varphi 11$ represents an optical power of the eleventh lens, $\varphi 12$ represents an optical power of the twelfth lens, $\varphi 13$ represents an optical power of the thirteenth lens, $\varphi 14$ represents an optical power of the fourteenth lens, Z1 represents an optical power of the first zoom lens group, Z2 represents an optical power of the second zoom lens group, and B represents an optical power of the compensation lens group.

The optical power of the second lens to the fourteenth lens satisfies the following conditions:

$$0.3 \le |\varphi 2/Z1| \le 2.1; 0.3 \le |\varphi 3/Z1| \le 2.0; 0.15 \le |\varphi 4/Z1| \le 1.5;$$

$$0.15 \le |\varphi 5/Z2| \le 1.5; 0.05 \le |\varphi 6/Z2| \le 0.8; 0.08 \le |\varphi 7/Z2| \le 1;$$

$$0.35 \le |\varphi 8/Z2| \le 2.5; 0.25 \le |\varphi 9/Z2| \le 2.2; 0.4 \le |\varphi 10/Z2| \le 3.9;$$

$$0.05 \le |\varphi 11/Z2| \le 0.85; 0.8 \le |\varphi 12/B| \le 5.5; 3.5 \le |\varphi 13/B| \le 55; \text{and}$$

$$4 \le |\varphi 14/B| \le 45.$$

In an embodiment, n1 represents a refractive index of the first lens, n2 represents a refractive index of the second lens, n3 represents a refractive index of the third lens, n4 represents a refractive index of the fourth lens, n5 represents a refractive index of the fifth lens, n6 represents a refractive index of the sixth lens, n7 represents a refractive index of the seventh lens, n8 represents a refractive index of the eighth lens, n9 represents a refractive index of the ninth lens, n10 represents a refractive index of the tenth lens, n11 represents a refractive index of the eleventh lens, n12 represents a refractive index of the twelfth lens, n13 represents a refractive index of the thirteenth lens, and n14 represents a refractive index of the fourteenth lens.

The refractive indices of the first lens to the fourteenth lens satisfy the following conditions:

$1.6 \leq n1 \leq 2.15; 1.58 \leq n2 \leq 1.95; 1.43 \leq n3 \leq 1.75;$
$1.71 \leq n4 \leq 2.15;$ $1.4 \leq n5 \leq 1.75; 1.55 \leq n6 \leq 1.95; 1.55 \leq n7 \leq 1.95;$
$1.4 \leq n8 \leq 1.75;$ $1.65 \leq n9 \leq 2.15; 1.4 \leq n10 \leq 1.75; 1.7 \leq n11 \leq 2.15;$
$1.65 \leq n12 \leq 2.15;$ $1.7 \leq n13 \leq 2.15;$ and $1.65 \leq n14 \leq 2.1.$ In an embodiment, the seventh lens and the eighth lens form a doublet lens, the ninth lens, the tenth lens, and the eleventh lens form a triplet lens, and the thirteenth lens and the fourteenth lens form a doublet lens.

In an embodiment, the first lens, the second lens, the fourth lens, the sixth lens, the seventh lens, the eighth lens, the ninth lens, the tenth lens, the eleventh lens, the thirteenth lens, and the fourteenth lens are spherical lenses, and the third lens, the fifth lens, and the twelfth lens are aspheric lenses.

In an embodiment, an aperture of the zoom lens satisfies the following condition: $0.9 \leq Fw - Ft \leq 1.4$.

Fw represents an aperture of the zoom lens at a wide-angle end, and Ft represents an aperture of the zoom lens at a telephoto end.

In an embodiment, a field of view of the zoom lens satisfies the following condition: $90° \leq FOV\text{-}w; FOV\text{-}t \leq 65°$.

FOV-w represents a field of view of the zoom lens at a wide-angle end, and FOV-t represents a field of view of the zoom lens at a telephoto end.

In an embodiment, an image circle diameter IC of the zoom lens and a total track length TTL of the zoom lens satisfy the following condition: $0.02 \leq IC/TTL \leq 1.2$.

BRIEF DESCRIPTION OF DRAWINGS

To illustrate technical solutions in the embodiments of the present disclosure or in the related art more clearly, drawings used in the description of the embodiments or the related art will be briefly described below. Apparently, even though the drawings described below illustrate merely part of the embodiments of the present disclosure, for those skilled in the art, the embodiments may be expanded and extended to other structures and drawings according to basic concepts of a device structure, a driving method, and a manufacturing method disclosed and suggested by various embodiments of the present disclosure. No doubt these should be within the scope of the claims of the present disclosure.

DETAILED DESCRIPTION

To make objectives, technical solutions, and advantages of the present disclosure clearer, the technical solutions of the present disclosure are clearly and completely described below with reference to drawings of embodiments of the present disclosure and in conjunction with implementations. Apparently, the embodiments described herein are a part, but not all, of the embodiments of the present disclosure. All other embodiments obtained by those skilled in the art on the basis of basic concepts disclosed and suggested by the embodiments of the present disclosure are within the scope of the present disclosure.

Embodiment One

Figure 1:
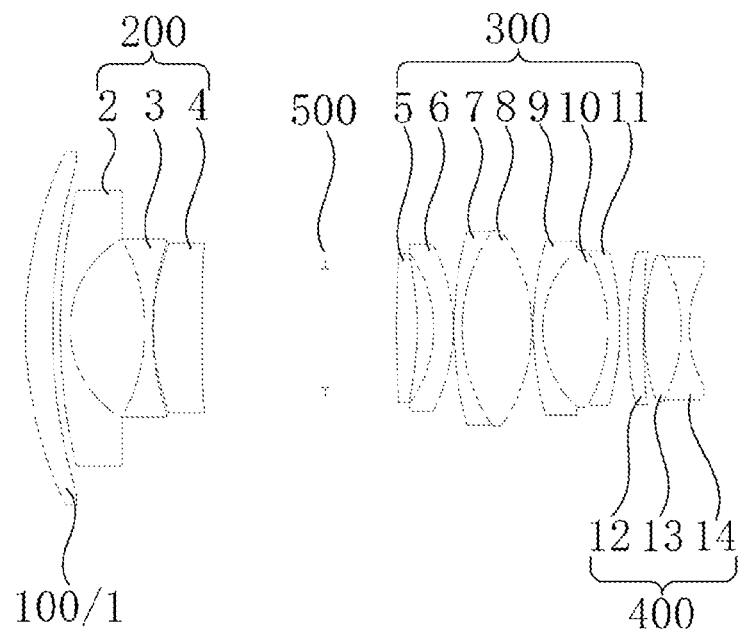
FIG. 1 is a structure view of a zoom lens at a wide-angle end according to embodiment one of the present disclosure.
Figure 2:
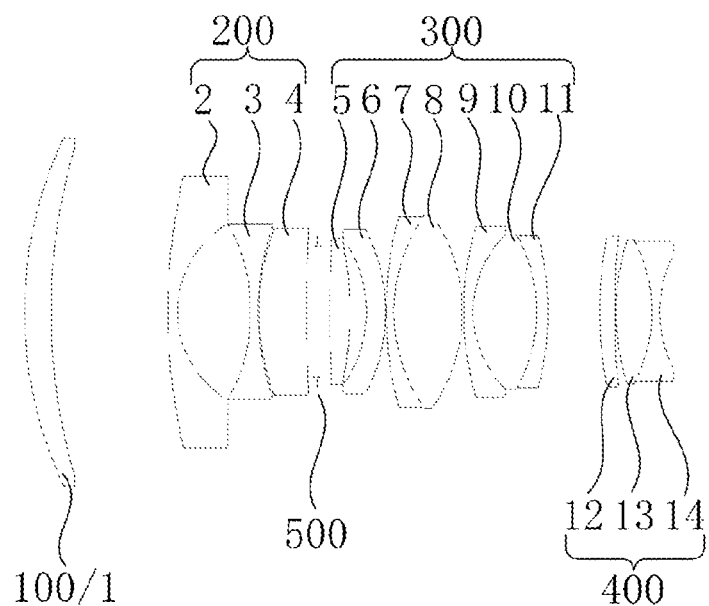
FIG. 2 is a structure view of the zoom lens at a telephoto end according to embodiment one of the present disclosure.

FIG. 1 is a structure view of a zoom lens at a wide-angle end according to embodiment one of the present disclosure; and FIG. 2 is a structure view of the zoom lens at a telephoto end according to embodiment one of the present disclosure. Referring to FIGS. 1 and 2, the zoom lens provided by embodiment one of the present disclosure includes a fixed lens group 100 having a positive optical power, a first zoom lens group 200 having a negative optical power, a second zoom lens group 300 having a positive optical power, and a compensation lens group 400 having a positive optical power which are sequentially arranged along an optical axis from an object side to an image side, where the first zoom lens group 200 and the second zoom lens group 300 are capable of reciprocating along the optical axis. The fixed lens group 100 includes a first lens 1, the first zoom lens group 200 includes a second lens 2, a third lens 3, and a fourth lens 4 which are sequentially arranged along the optical axis from the object side to the image side, the second zoom lens group 300 includes a fifth lens 5, a sixth lens 6, a seventh lens 7, an eighth lens 8, a ninth lens 9, a tenth lens 10, and an eleventh lens 11 which are sequentially arranged along the optical axis from the object side to the image side, and the compensation lens group 400 includes a twelfth lens 12, a thirteenth lens 13, and a fourteenth lens 14 which are sequentially arranged along the optical axis from the object side to the image side.

Exemplarily, referring to FIGS. 1 and 2, the zoom lens provided by the embodiment of the present disclosure includes the first lens 1, the second lens 2, the third lens 3, the fourth lens 4, the fifth lens 5, the sixth lens 6, the seventh lens 7, the eighth lens 8, the ninth lens 9, the tenth lens 10, the eleventh lens 11, the twelfth lens 12, the thirteenth lens 13, and the fourteenth lens 14 which are sequentially arranged along the optical axis from the object side to the image side. The first lens 1 as the fixed lens group 100 is used for converging external light. The second lens 2, the third lens 3, and the fourth lens 4 form the first zoom lens group 200, and the fifth lens 5, the sixth lens 6, the seventh lens 7, the eighth lens 8, the ninth lens 9, the tenth lens 10, and the eleventh lens 11 form the second zoom lens group 300, where the first zoom lens group 200 and the second zoom lens group 300 can move along the optical axis so that a focal length of the zoom lens can be continuously changed from a wide-angle end to a telephoto end, ensuring that the zoom lens is miniaturized while the zoom lens has a relatively high image quality in each focus position. The twelfth lens 12, the thirteenth lens 13, and the fourteenth lens 14 form the compensation lens group 400, where the compensation lens group 400 is disposed behind the second zoom lens group 300 for compensating for various aberrations formed during imaging. In the embodiment of the present disclosure, the fixed lens group 100, the first zoom lens group 200, the second zoom lens group 300, and the compensation lens group 400 may be disposed in one lens barrel (not shown in FIGS. 1 and 2). In addition, the zoom lens may further include a diaphragm 500 in an optical path between the first zoom lens group 200 and the second zoom lens group 300, where the diaphragm 500 can adjust a propagation direction of a light beam, thereby facilitating the improvement of an imaging quality.

It is to be understood that in the process of implementing zoom through the movements of the first zoom lens group 200 and the second zoom lens group 300, the zoom lens is located at the wide-angle end when the focal length is shortest, and the zoom lens is located at the telephoto end when the focal length is longest. The focal length and optical power of the zoom lens at the wide-angle end are different from the focal length and optical power of the zoom lens at the telephoto end. In addition, a length or a shape of the zoom lens at the wide-angle end is different from a length or a shape of the zoom lens at the telephoto end.

Further, the optical power is the inverse of the focal length and characterizes the capability of an optical system to deflect light rays. The greater the absolute value of the optical power is, the stronger the capability to deflect the light rays is; and the smaller the absolute value of the optical power is, the weaker the capability to deflect the light rays is. When the optical power is positive, the refraction of the light rays is convergent; and when the optical power is negative, the refraction of the light rays is divergent. The optical power may be used for characterization for a certain lens or a system formed by multiple lenses together (that is, a lens group). In this embodiment, the fixed lens group 100 has the positive optical power, the first zoom lens group 200 has the negative optical power, the second zoom lens group 300 has the positive optical power, and the compensation lens group 400 has the positive optical power so that the optical powers of the fixed lens group 100, the first zoom lens group 200, the second zoom lens group 300 and the compensation lens group 400 cooperate with each other to enable compensation of aberrations caused during the zoom through the movements of the first zoom lens group 200 and the second zoom lens group 300, thereby ensuring clear images at different focal lengths.

In the zoom lens provided by the embodiment of the present disclosure, the first zoom lens group and the second zoom lens group reciprocate along the optical axis so that the zoom of the lens is implemented. The number of lenses included in each lens group and the optical power of each lens group are properly set so that the aberrations can be better corrected to ensure clear images at different focal lengths. Thus, the zoom lens has an ultra wide angle, a constant large aperture (F1.0 to F1.2), and an infrared confocal capability in all focal length ranges, and the zoom lens has a maximum angle of more than 135° at the wide-angle end, which is applicable to a 1/1.8" big target-surface photosensitive chip and satisfies the service condition of −40° C. to 80° C.

Referring to FIGS. 1 and 2, on the basis of the preceding embodiment, optionally, an optical power G of the fixed lens group 100 and an optical power B of the compensation lens group 400 satisfy the following condition: $0.2 \leq |G/B| \leq 2.5$; an optical power Z1 of the first zoom lens group 200 and the optical power B of the compensation lens group 400 satisfy the following condition: $3 \leq |Z1/B| \leq 30$; and an optical power Z2 of the second zoom lens group 300 and the optical power B of the compensation lens group 400 satisfy the following condition: $2 \leq |Z2/B| \leq 25$.

Proportional relationships between the optical power of the compensation lens group 400 and the optical power of the fixed lens group 100, the optical power of the first zoom lens group 200, and the optical power of the second zoom lens group 300 are properly set to cause the optical power of the compensation lens group 400 and the optical power of the fixed lens group 100, the optical power of the first zoom lens group 200, and the optical power of the second zoom lens group 300 to cooperate with each other. Thus, the zoom lens having the ultra wide angle, the constant large aperture (F1.0 to F1.2), and the infrared confocal capability in all focal length ranges can be provided.

Optionally, the first lens 1 has a positive optical power, the second lens 2 has a negative optical power, the third lens 3 has a negative optical power, the fourth lens 4 has a positive optical power, the fifth lens 5 has a positive optical power, the sixth lens 6 has a negative optical power, the seventh lens 7 has a negative optical power, the eighth lens 8 has a positive optical power, the ninth lens 9 has a negative optical power, the tenth lens 10 has a positive optical power, the eleventh lens 11 has a negative optical power, the twelfth lens 12 has a positive optical power, the thirteenth lens 13 has a positive optical power, and the fourteenth lens 14 has a negative optical power.

The optical powers of the lenses are properly combined so that the aberrations can be better corrected and no virtual focus occurs in the temperature range of −40° C. to 80° C. Thus, the zoom lens having the ultra wide angle, the constant large aperture (F1.0 to F1.2), and the infrared confocal capability in all focal length ranges is provided.

Optionally, optical powers of the second lens 2 to the fourteenth lens 14 satisfy the following conditions:

$$0.3 \leq |\varphi 2/Z1| \leq 2.1; 0.3 \leq |\varphi 3/Z1| \leq 2.0; 0.15 \leq |\varphi 4/Z1| \leq 1.5;$$

$$0.15 \leq |\varphi 5/Z2| \leq 1.5; 0.05 \leq |\varphi 6/Z2| \leq 0.8; 0.08 \leq |\varphi 7/Z2| \leq 1;$$

$$0.35 \leq |\varphi 8/Z2| \leq 2.5; 0.25 \leq |\varphi 9/Z2| \leq 2.2; 0.4 \leq |\varphi 10/Z2| \leq 3.9;$$

$$0.05 \leq |\varphi 11/Z2| \leq 0.85; 0.8 \leq |\varphi 12/B| \leq 5.5; 3.5 \leq |\varphi 13/B| \leq 55; \text{and}$$

$4 \leq |\varphi 14/B| \leq 45$, where $\varphi 2$ represents an optical power of the second lens 2, $\varphi 3$ represents an optical power of the third lens 3, $\varphi 4$ represents an optical power of the fourth lens 4, $\varphi 5$ represents an optical power of the fifth lens 5, $\varphi 6$ represents an optical power of the sixth lens 6, $\varphi 7$ represents an optical power of the seventh lens 7, $\varphi 8$ represents an optical power of the eighth lens 8, $\varphi 9$ represents an optical power of the ninth lens 9, $\varphi 10$ represents an optical power of the tenth lens 10, $\varphi 11$ represents an optical power of the eleventh lens 11, $\varphi 12$ represents an optical power of the twelfth lens 12, $\varphi 13$ represents an optical power of the thirteenth lens 13, $\varphi 14$ represents an optical power of the fourteenth lens 14, Z1 represents an optical power of the first zoom lens group 200, Z2 represents an optical power of the second zoom lens group 300, and B represents an optical power of the compensation lens group 400.

In the embodiment of the present disclosure, a proportional relationship between the optical power of each lens in each lens group and the optical power of the corresponding lens group is properly set, which is conducive to better correcting the aberrations to ensure that clear images at different focal lengths.

As a feasible implementation, refractive indices of the first lens to the fourteenth lens satisfy the following conditions:

$$1.6 \leq n1 \leq 2.15; 1.58 \leq n2 \leq 1.95; 1.43 \leq n3 \leq 1.75;$$
$$1.71 \leq n4 \leq 2.15; 1.4 \leq n5 \leq 1.75; 1.55 \leq n6$$

$$\leq 1.95; 1.55 \leq n7 \leq 1.95; 1.4 \leq n8 \leq 1.75; 1.65 \leq n9 \leq 2.15;$$
$$1.4 \leq n10 \leq 1.75; 1.7 \leq n11 \leq 2.15;$$

$1.65 \leq n12 \leq 2.15$; $1.7 \leq n13 \leq 2.15$; and $1.65 \leq n14 \leq 2.1$, where n1 represents a refractive index of the first lens 1, n2 represents a refractive index of the second lens 2, n3 represents a refractive index of the third lens 3, n4 represents a refractive index of the fourth lens 4, n5 represents a refractive index of the fifth lens 5, n6 represents a refractive index of the sixth lens 6, n7 represents a refractive index of the seventh lens 7, n8 represents a refractive index of the eighth lens 8, n9 represents a refractive index of the ninth lens 9, n10 represents a refractive index of the tenth lens 10, n11 represents a refractive index of the eleventh lens 11, n12 represents a refractive index of the twelfth lens 12, n13 represents a refractive index of the thirteenth lens 13, and n14 represents a refractive index of the fourteenth lens 14.

The refractive index is a ratio of a propagation speed of light in a vacuum to a propagation speed of light in a medium. The refractive index is mainly used for describing the capability of a material to refract light, where different materials have different refractive indices. According to the embodiment of the present disclosure, the refractive indices of the lenses in the zoom lens are combined, which is conducive to implementing the miniaturization design of the zoom lens and achieving a relatively high pixel resolution and a relatively large aperture.

Referring to FIGS. 1 and 2, optionally, the seventh lens 7 and the eighth lens 8 form a doublet lens, the ninth lens 9, the tenth lens 10, and the eleventh lens 11 form a triplet lens, and the thirteenth lens 13 and the fourteenth lens 14 form a doublet lens.

The cementing of lenses can effectively reduce an air gap between the lenses so that the total length of the lens is reduced, thereby causing the overall structure of the zoom lens to be compact and satisfying a miniaturization requirement. In addition, a cemented lens is conducive to eliminating chromatic aberrations so that various aberrations of the zoom lens can be sufficiently corrected. In this case, on the premise of the compact structure, the resolution can be improved, the optical performance such as distortion and a chief ray angle (CRA) can be optimized, and the amount of lost light caused by the reflection between the lenses can be reduced to improve illuminance, thereby improving the image quality and the clarity of lens imaging. In addition, the use of a cemented lens can also reduce assembly parts between two lenses, thereby simplying the assembly procedure of the lens during manufacturing, reducing the cost and alleviating tolerance sensitivity of a lens unit such as tilt or eccentricity caused during the assembly.

Referring to FIGS. 1 and 2, optionally, the first lens 1, the second lens 2, the fourth lens 4, the sixth lens 6, the seventh lens 7, the eighth lens 8, the ninth lens 9, the tenth lens 10, the eleventh lens 11, the thirteenth lens 13, and the fourteenth lens 14 are spherical lenses. The third lens 3, the fifth lens 5, and the twelfth lens 12 are aspheric lenses.

Specifically, a spherical lens is characterized by having a constant curvature from the center of the lens to the periphery of the lens, thereby ensuring simply arrangement of the lens. An aspheric lens is characterized by having a continuously changing curvature from the center of the lens to the periphery of the lens. Unlike the spherical lens having the constant curvature from the center of the lens to the periphery of the lens, the aspheric lens has a better curvature radius characteristic, which features reduced distortion and astigmatic aberrations. With the use of the aspheric lens, the aberrations which occur during the imaging can be eliminated as much as possible, thereby improving the imaging quality of the lens. In this embodiment, part of the lenses in the zoom lens are the spherical lenses, and part of the lenses in the zoom lens are the aspheric lens. The spherical lenses and the aspheric lenses cooperate with each other to improve the imaging quality of the zoom lens and simplify an arrangement manner of the zoom lens.

Further, a material of each lens in the zoom lens may be set according to actual requirements. For example, the first lens 1, the second lens 2, the fourth lens 4, the sixth lens 6, the seventh lens 7, the eighth lens 8, the ninth lens 9, the tenth lens 10, the eleventh lens 11, the thirteenth lens 13, and the fourteenth lens 14 may be glass spherical lenses. The third lens 3, the fifth lens 5, and the twelfth lens 12 may be plastic aspheric lenses. The glass spherical lenses are easy to process, and the cost of plastic lenses is much lower than the cost of glass lenses. With the mixed combination of the glass lenses and the plastic lenses, the cost of the prime lens can be effectively controlled while the optical performance of a prime lens is ensured. In addition, the material of each lens has a mutual compensating effect, which can ensure that the lens can still be used normally in high-temperature and low-temperature environments. It is to be understood that the third lens 3, the fifth lens 5, and the twelfth lens 12 may also be glass aspheric lenses in other embodiments.

Materials of the plastic aspheric lenses may be various types of plastic known to those skilled in the art, and materials of the glass spherical lenses may be various types of glass known to those skilled in the art, which are not described in detail and not limited in the embodiment of the present disclosure.

Optionally, the aperture of the zoom lens satisfies the following condition: $0.9 \leq Fw-Ft \leq 1.4$, where Fw represents the aperture of the zoom lens at the wide-angle end, and Ft represents the aperture of the zoom lens at the telephoto end.

The zoom lens provided by the embodiment of the present disclosure has the ultra wide angle and the constant large aperture (F1.0 to F1.2). The aperture Fw of the zoom lens at the wide-angle end and the aperture Ft of the zoom lens at the telephoto end have a range of 0.9 to 1.4, which satisfies the requirement for super-high luminous flux and surveillance requirements under the low-light condition.

Optionally, a field of view of the zoom lens satisfies the following condition: $90° \leq FOV\text{-}w$; $FOV\text{-}t \leq 65°$, where FOV-w represents the field of view of the zoom lens at the wide-angle end, and FOV-t represents the field of view of the zoom lens at the telephoto end.

The zoom lens provided by the embodiment of the present disclosure has a relatively large field of view, where the zoom lens can have a field of view of more than 90° (further, a maximum angle of more than 135°) at the wide-angle end and can have a field of view of more than 60° at the telephoto end, which meets the requirement for a large field of view. Optionally, an image circle diameter IC of the zoom lens and a total track length TTL of the zoom lens satisfy the following condition: $0.02 \leq IC/TTL \leq 1.2$.

IC represents an effective image circle diameter of the zoom lens, and TTL represents a total optical length of the zoom lens which is a distance from an optical axis center of an object-side surface of the first lens 1 to an image surface. The relationship between the image circle diameter and the total track length is properly set so that the requirement of the image surface is satisfied and the total track length of the optical lens is reduced, thereby implementing the miniaturization of the zoom lens and facilitating assembly in a later stage.

In summary, in the embodiment of the present disclosure, the optical powers are properly combined so that the zoom lens has the ultra wide angle, the constant large aperture (F1.0 to F1.2) and the infrared confocal capability in all focal length ranges. The zoom lens has the maximum angle of more than 135° at the wide-angle end, which is applicable to the 1/1.8" big target-surface photosensitive chip and satisfies the service condition of −40° C. to 80° C. Thus, the zoom lens having the ultra wide angle, the constant large aperture, a big target surface and a small volume is provided.

Exemplarily, with a feasible implementation, Table 1 illustrates in detail specific optical physical parameters of each lens in the zoom lens provided by embodiment one of the present disclosure, where the zoom lens in Table 1 corresponds to the zoom lens shown in FIGS. 1 and 2.

TABLE 1

Optical physical parameters of the first lens to the fourteenth lens

| Surface Number | Surface Type | Radius of Curvature | Thickness | Material (nd) | Material (vd) | K Coefficient |
|---|---|---|---|---|---|---|
| 1 | Spherical surface | 39.352 | 2.586 | 1.91 | 22.67 | |
| 2 | Spherical surface | 56.057 | Variable spacing 1 | | | |
| 3 | Spherical surface | 56.909 | 0.95 | 1.73 | 55 | |
| 4 | Spherical surface | 9.964 | 7.146 | | | |
| 5 | Aspheric surface | −19.516 | 0.732 | 1.59 | 60.47 | 2.132 |
| 6 | Aspheric surface | 22.368 | 0.097 | | | −14.124 |
| 7 | Spherical surface | 22.456 | 4.648 | 1.95 | 17.75 | |
| 8 | Spherical surface | 179.768 | Variable spacing 2 | | | |
| STO | PL | INF | Variable spacing 3 | | | |
| 10 | Aspheric surface | 60.951 | 2 | 1.62 | 63 | 45.032 |
| 11 | Aspheric surface | −30.535 | 1.624 | | | −7.817 |
| 12 | Spherical surface | −12.381 | 1.869 | 1.80 | 47.66 | |
| 13 | Spherical surface | −17.391 | 0.058 | | | |
| 14 | Spherical surface | 35.382 | 0.768 | 1.65 | 41.72 | |
| 15 | Spherical surface | 16.433 | 6.699 | 1.59 | 67.75 | |
| 16 | Spherical surface | −16.509 | 0.118 | | | |
| 17 | Spherical surface | 28.985 | 0.947 | 1.81 | 26 | |
| 18 | Spherical surface | 10.569 | 6.22 | 1.59 | 68.62 | |

TABLE 1-continued

Optical physical parameters of the first lens to the fourteenth lens

| Surface Number | Surface Type | Radius of Curvature | Thickness | Material (nd) | Material (vd) | K Coefficient |
|---|---|---|---|---|---|---|
| 19 | Spherical surface | −15.185 | 1.111 | 2 | 28.29 | |
| 20 | Spherical surface | −28.27 | Variable spacing 4 | | | |
| 21 | Aspheric surface | 35.863 | 1.512 | 1.86 | 41.64 | −39.157 |
| 22 | Aspheric surface | 131.359 | 0.063 | | | 8.872 |
| 23 | Spherical surface | 21.814 | 3.535 | 1.99 | 16.83 | |
| 24 | Spherical surface | −15.022 | 0.748 | 1.85 | 23.1 | |
| 25 | Spherical surface | 11.659 | | | | |

The surface numbers in Table 1 are numbered according to surface orders of each lens. For example, "1" represents an object-side surface of the first lens 1, "2" represents an image-side surface of the first lens 1, "3" represents an object-side surface of the second lens 2, "4" represents an image-side surface of the second lens 2, and so on. "15" represents a cemented surface between the seventh lens 7 and the eighth lens 8, "18" represents a cemented surface between the ninth lens 9 and the tenth lens 10, "19" represents a cemented surface of the tenth lens 10 and the eleventh lens 11, and "24" represents a cemented surface of the thirteenth lens 13 and the fourteenth lens 14. The radius of curvature represents a curvature degree of a lens surface, where a positive value indicates that the surface is bent toward an image surface, a negative value indicates that the surface is bent toward an object surface, and "PL" indicates that the surface is a plane and has an infinite radius of curvature. The thickness represents the axial distance from the center of a current surface to the center of a next surface. The radius of curvature and the thickness are in a unit of millimeter (mm). The material (nd) represents a refractive index which indicates the capability of a material between the current surface and the next surface to deflect light rays, where a space indicates that air is in a current position, and the refractive index is 1. The material (vd) represents a dispersion coefficient which indicates a dispersion characteristic of the material between the current surface and the next surface for light, where a space indicates that air is in the current position. A value of K represents a magnitude of a best-fit cone coefficient of the aspheric surface. STO represents a diaphragm.

Design values of the variable spacings in Table 1 are listed in Table 2:

TABLE 2

Design values of the variable spacings of the zoom lens at the wide-angle end and the telephoto end

| | Wide-angle End | Telephoto End |
|---|---|---|
| Variable spacing 1 | 0.735 | 11.45 |
| Variable spacing 2 | 11.78 | 1.07 |
| Variable spacing 3 | 6.81 | 1.19 |
| Variable spacing 4 | 0.8 | 5.05 |

A shape equation Z of the aspheric surface of the lens satisfies the following condition:

$$z = \frac{cy^2}{1 + \sqrt{1 - (1+k)c^2 y^2}} + Ay^4 + By^6 + Cy^8 + Dy^{10} + Ey^{12} + Fy^{14}.$$

In the equation, Z represents a distance (sag) from a position on the aspheric surface with a height of y to the vertex of the aspheric surface along the optical axis; c=1/R, where R represents a paraxial curvature radius of the lens surface; K is a cone coefficient; and A, B, C, D, E, and F represent high-order aspheric coefficients.

Aspheric coefficients of each lens in the zoom lens provided by embodiment one of the present disclosure are listed in Table 3:

TABLE 3

Design values of aspheric coefficients of each lens in the zoom lens

| Surface Number | A | B | C | D | E | F |
|---|---|---|---|---|---|---|
| 5 | −2.118E−5 | 8.551E−7 | −1.507E−8 | 1.383E−10 | 2.024E−15 | 0 |
| 6 | 8.638E−5 | −6.376E−7 | −2.839E−9 | 9.554E−11 | −7.832E−15 | 0 |
| 10 | −1.006E−4 | −1.661E−7 | −7.062E−9 | 1.245E−10 | −2.501E−12 | 1.561E−15 |
| 11 | −1.128E−5 | 6.584E−7 | 4.344E−10 | 7.722E−11 | 4.026E−14 | 1.496E−15 |
| 21 | 7.544E−5 | −2.01E−6 | 5.678E−8 | −4.12E−10 | −1.656E−13 | −2.14E−15 |
| 22 | 9.41E−6 | −6.616E−7 | 5.023E−8 | −4.305E−10 | −1.9E−13 | −9.765E−16 |

In Table 3, −2.118E-5 indicates that the coefficient A for the surface with surface number 5 is −2.118*10$^{-5}$, and so on.

The zoom lens provided by embodiment one of the present disclosure has the following technical indices:

TABLE 4

Technical indices of the zoom lens

| | Wide-angle End | Telephoto End |
|---|---|---|
| Aperture | 0.999 | 1.19 |
| Focal length | 4.65 | 10.14 |
| Field of view | 136° | 52° |

Figure 3:
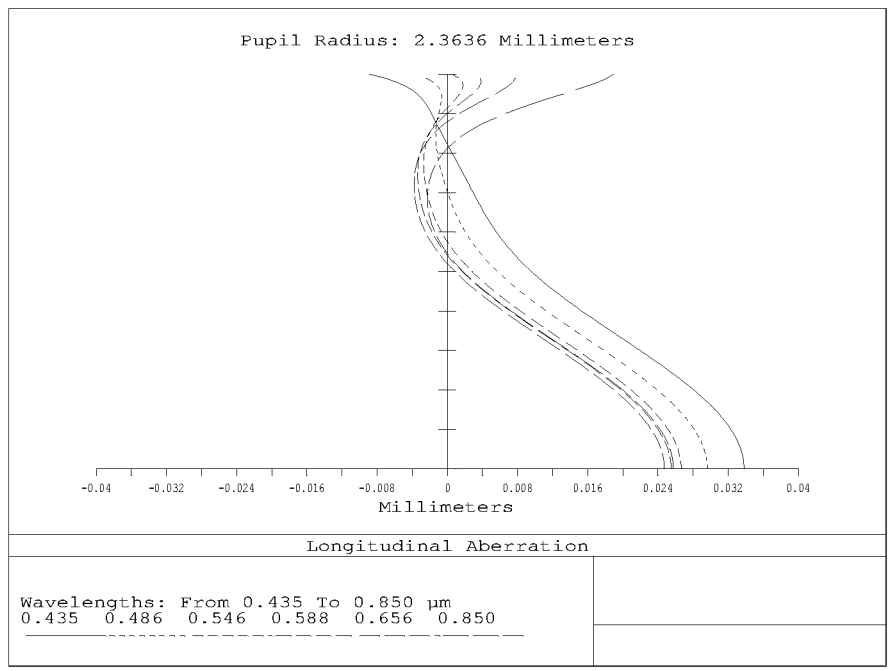
FIG. 3 is a plot showing spherical aberration curves of the zoom lens at the wide-angle end according to embodiment one of the present disclosure.

FIG. 3 is a plot showing spherical aberration curves of the zoom lens at the wide-angle end according to embodiment one of the present disclosure. As shown in FIG. 3, spherical aberrations of the zoom lens at different wavelengths (0.435 μm, 0.486 μm, 0.546 μm, 0.588 μm, 0.656 μm, and 0.850 μm) are within 0.036 mm, and the curves at the different wavelengths are relatively concentrated, which indicates that axial aberrations of the zoom lens are relatively small. Therefore, it can be seen that the zoom lens provided by the embodiment of the present disclosure can better correct the aberrations at the wide-angle end.

Figure 4:
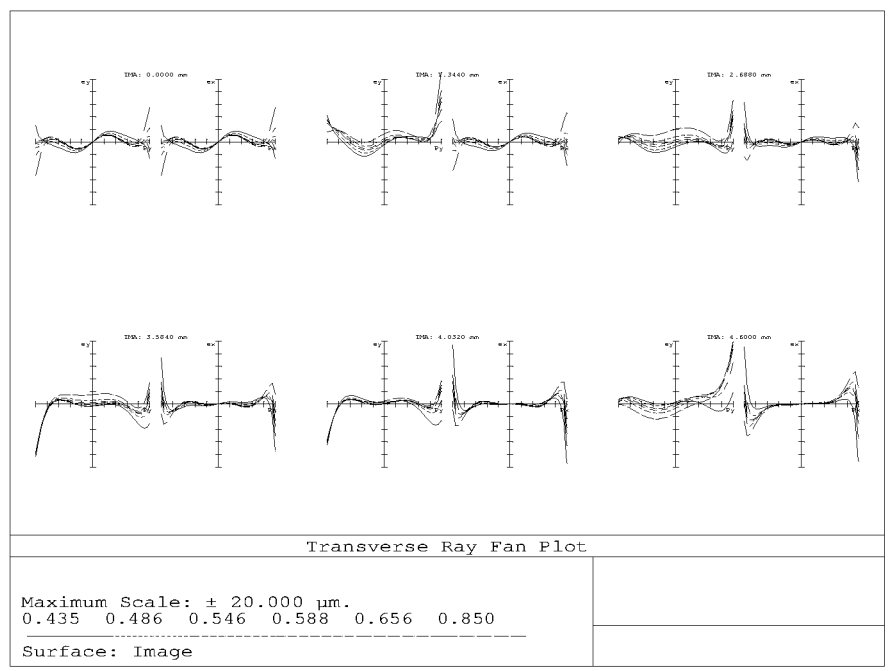
FIG. 4 shows ray fan plots of the zoom lens at the wide-angle end according to embodiment one of the present disclosure.

FIG. 4 shows ray fan plots of the zoom lens at the wide-angle end according to embodiment one of the present disclosure. As shown in FIG. 4, imaging ranges of light rays of different wavelengths (0.435 μm, 0.486 μm, 0.546 μm, 0.588 μm, 0.656 μm, and 0.850 μm) at different fields of view of the zoom lens are within 20 μm, and the curves are very concentrated, which ensures that aberrations in regions at the different fields of view are relatively small, that is, the zoom lens better corrects the aberrations of the optical system at the wide-angle end.

Figure 5:
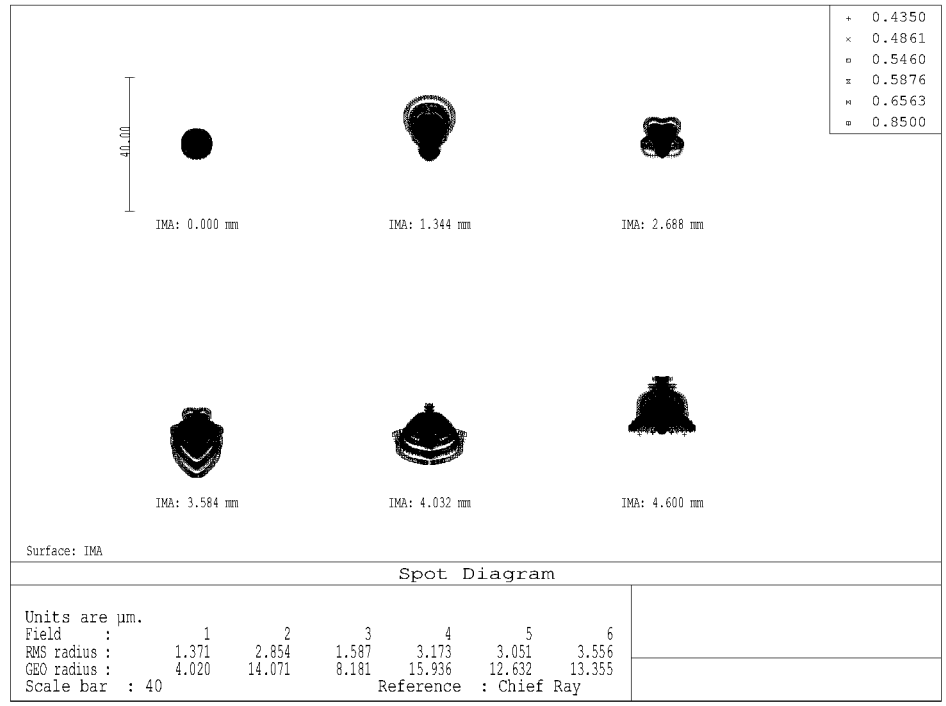
FIG. 5 shows spot diagrams of the zoom lens at the wide-angle end according to embodiment one of the present disclosure.

FIG. 5 shows spot diagrams of the zoom lens at the wide-angle end according to embodiment one of the present disclosure, where a spot diagram is one of the most commonly used evaluation methods in modern optical design. The spot diagram shows that after light rays emitted from a point light source pass through the optical system, intersection points of the light rays and the image surface are no longer concentrated at the same point due to the aberrations, but dispersed in a certain range, thereby forming a dispersion pattern. As shown in FIG. 5, with the zoom lens provided by the embodiment of the present disclosure, the dispersion pattern of the light rays of different wavelengths (0.435 μm, 0.486 μm, 0.546 μm, 0.588 μm, 0.656 μm, and 0.850 μm) in each field of view is relatively concentrated and uniformly distributed, without a phenomenon that a dispersion pattern at a certain field of view is greatly separated from top to bottom along with the wavelength, which indicates that there is no obvious purple fringing. In addition, root mean square (RMS) radii of the light rays of different wavelengths (0.435 μm, 0.486 μm, 0.546 μm, 0.588 μm, 0.656 μm, and 0.850 μm) at the fields of view of the zoom lens are 1.371 μm, 2.854 μm, 1.587 μm, 3.173 μm, 3.051 μm, and 3.556 μm, respectively, which indicates that the RMS radii at the fields of view are each less than 4 μm. That is, the zoom lens has relatively low chromatic aberrations and relatively low aberrations at the wide-angle end. Thus, the problem of purple fringing of imaging at each waveband is solved and high-resolution imaging can be implemented.

Figure 6:
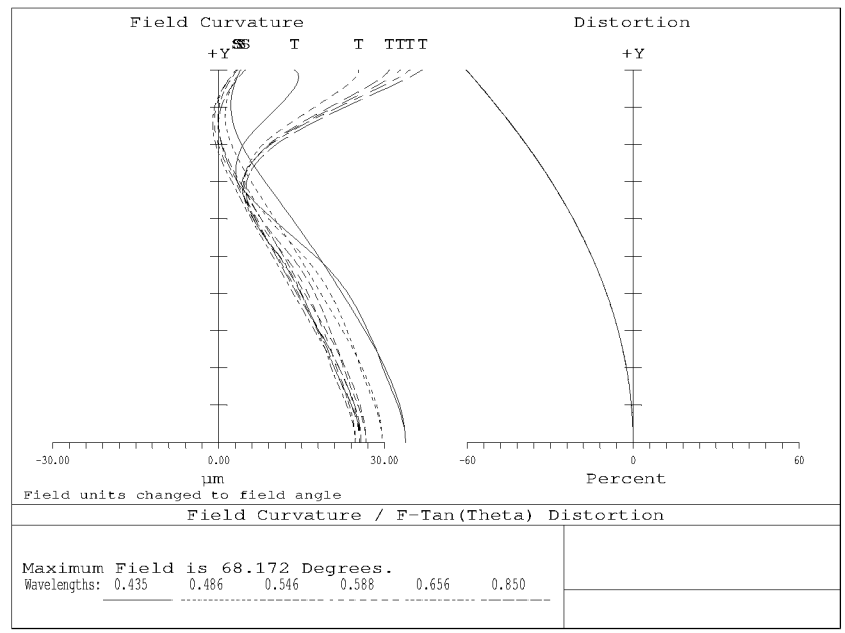
FIG. 6 shows a field curvature plot and a distortion plot of the zoom lens at the wide-angle end according to embodiment one of the present disclosure.

FIG. 6 shows a field curvature plot and a distortion plot of the zoom lens at the wide-angle end according to embodiment one of the present disclosure. As shown in FIG. 6, in the left coordinate system, the abscissa represents a magnitude of field curvature in a unit of millimeter, and the ordinate represents a normalized image height which has no unit, where T represents "meridian" and S represents "sagittal". It can be seen from FIG. 6 that for light with a wavelength of 435 nm to 850 nm, the zoom lens provided by this embodiment is effectively controlled in terms of field curvature. That is, when the imaging is performed, the difference between the image quality at a center and the image quality at a periphery is relatively small. In the right coordinate system, the abscissa represents a magnitude of distortion in a unit of percentage; and the ordinate represents a normalized image height which has no unit. It can be seen from FIG. 6 that the distortion of the zoom lens provided by this embodiment at the wide-angle end is better corrected, so that the imaging distortion is relatively small, which satisfies the requirement for low distortions.

Figure 7:
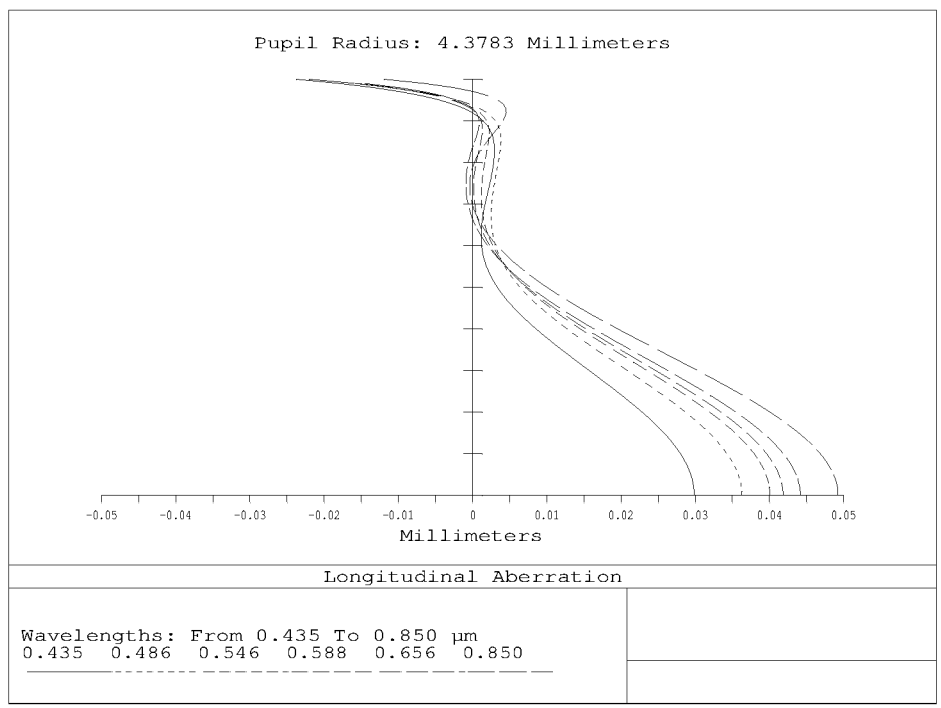
FIG. 7 is a plot showing spherical aberration curves of the zoom lens at the telephoto end according to embodiment one of the present disclosure.

FIG. 7 is a plot showing spherical aberration curves of the zoom lens at the telephoto end according to embodiment one of the present disclosure. As shown in FIG. 7, spherical aberrations of the zoom lens at the different wavelengths (0.435 μm, 0.486 μm, 0.546 μm, 0.588 μm, 0.656 μm, and 0.850 μm) are within 0.05 mm, and the curves at the different wavelengths are relatively concentrated, which indicates that axial aberrations of the zoom lens are relatively small. Therefore, it can be seen that the zoom lens provided by the embodiment of the present disclosure can better correct the aberrations at the telephoto end.

Figure 8:
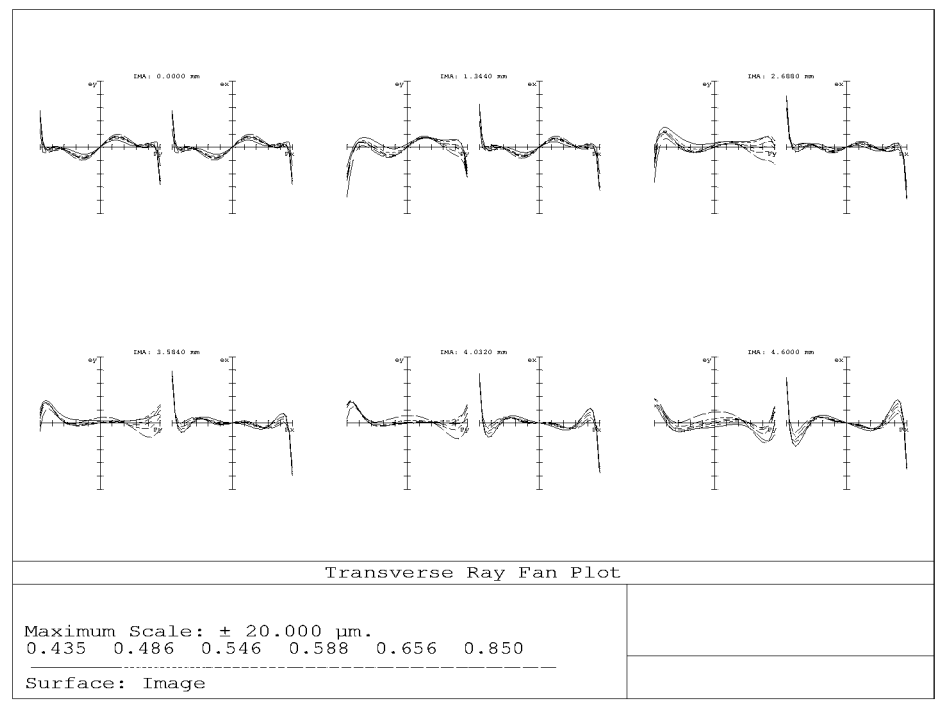
FIG. 8 shows ray fan plots of the zoom lens at the telephoto end according to embodiment one of the present disclosure.

FIG. 8 shows ray fan plots of the zoom lens at the telephoto end according to embodiment one of the present disclosure. As shown in FIG. 8, imaging ranges of the light rays of different wavelengths (0.435 μm, 0.486 μm, 0.546 μm, 0.588 μm, 0.656 μm, and 0.850 μm) at the different fields of view of the zoom lens are within 20 μm, and the curves are very concentrated, which ensures that aberrations in the regions at the different fields of view are relatively small, that is, the zoom lens better corrects the aberrations of the optical system at the telephoto end.

Figure 9:
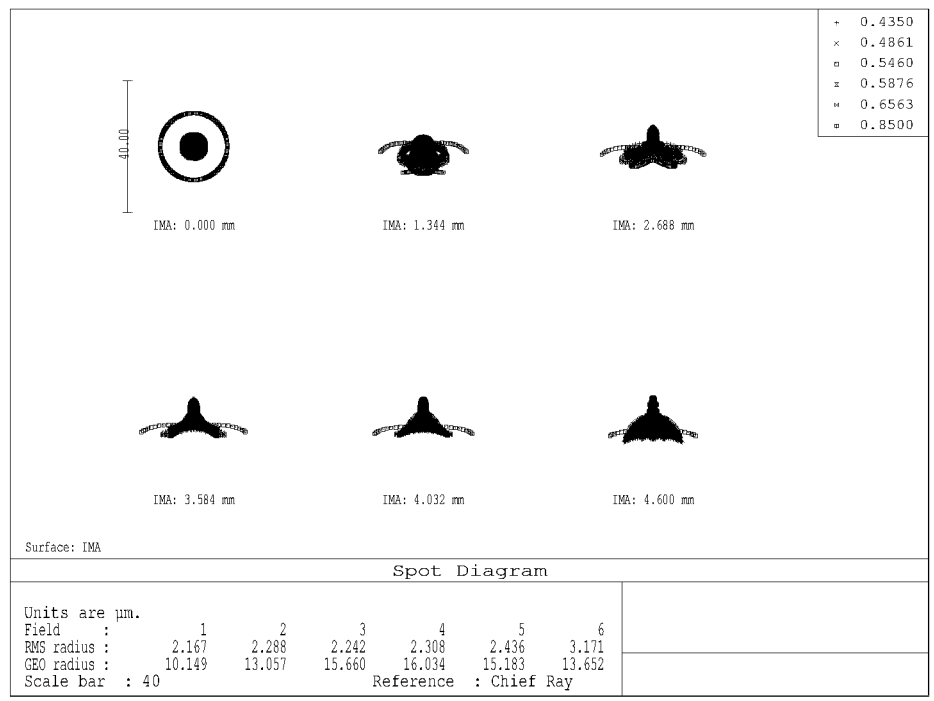
FIG. 9 shows spot diagrams of the zoom lens at the telephoto end according to embodiment one of the present disclosure.

FIG. 9 shows spot diagrams of the zoom lens at the telephoto end according to embodiment one of the present disclosure. As shown in FIG. 9, with the zoom lens provided by the embodiment of the present disclosure, a dispersion patterm of the light rays of different wavelengths (0.435 μm, 0.486 μm, 0.546 μm, 0.588 μm, 0.656 μm, and 0.850 μm) in each field of view is relatively concentrated and uniformly distributed, without a phenomenon that a dispersion pattern at a certain field of view is greatly separated from top to bottom along with the wavelength, which indicates that there is no obvious purple fringing. In addition, RMS radii of the light rays of different wavelengths (0.435 μm, 0.486 μm, 0.546 μm, 0.588 μm, 0.656 μm, and 0.850 μm) at the fields of view of the zoom lens are 2.167 μm, 2.288 μm, 2.242 μm, 2.308 μm, 2.436 μm, and 3.171 μm, respectively, which indicates that the RMS radii at the fields of view are each less than 4 μm, that is, the zoom lens has relatively low chromatic aberrations and relatively low aberrations at the telephoto end. Thus, the problem of the purple fringing of the imaging at each waveband is solved and the high-resolution imaging can be implemented.

Figure 10:
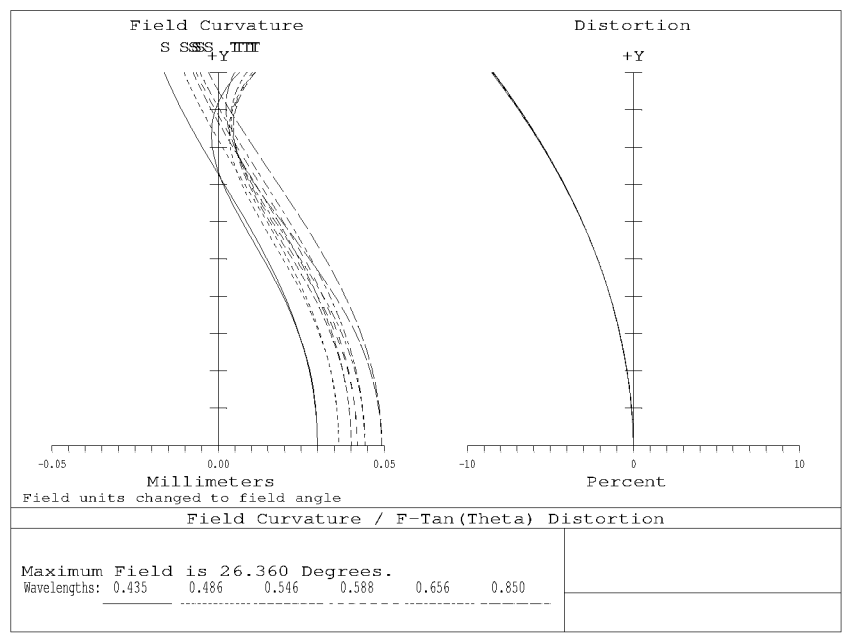
FIG. 10 shows a field curvature plot and a distortion plot of the zoom lens at the telephoto end according to embodiment one of the present disclosure.

FIG. 10 shows a field curvature plot and a distortion plot of the zoom lens at the telephoto end according to embodiment one of the present disclosure. As shown in FIG. 10, in the left coordinate system, the abscissa represents a magnitude of field curvature in a unit of millimeter; and the ordinate represents a normalized image height which has no unit, where T represents "meridian" and S represents "sagittal". It can be seen from FIG. 10 that for light rays with the wavelengths of 435 nm to 850 nm, the zoom lens provided by this embodiment is effectively controlled in terms of field curvature. That is, when the imaging is performed, the difference between the image quality at a center and the image quality at a periphery is relatively small. In the right coordinate system, the abscissa represents a magnitude of the distortion in a unit of percentage; and the ordinate represents a normalized image height which has no unit. It can be seen from FIG. 10 that the distortion of the zoom lens provided by this embodiment at the telephoto end is better corrected, so that the imaging distortion is relatively small, which satisfies the requirement for low distortions.

Embodiment Two

Figure 11:
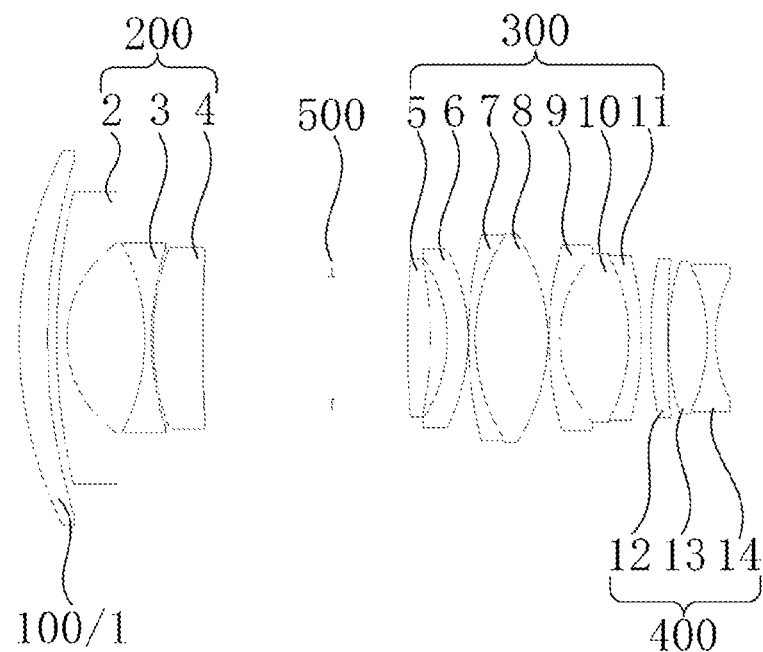
FIG. 11 is a structure view of a zoom lens at a wide-angle end according to embodiment two of the present disclosure.
Figure 12:
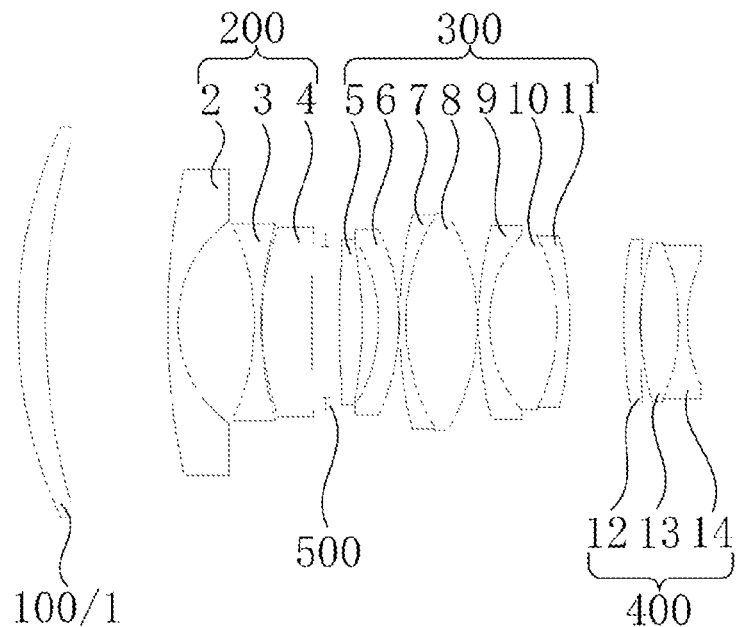
FIG. 12 is a structure view of the zoom lens at a telephoto end according to embodiment two of the present disclosure.

FIG. 11 is a structure view of a zoom lens at a wide-angle end according to embodiment two of the present disclosure;

and FIG. 12 is a structure view of the zoom lens at a telephoto end according to embodiment two of the present disclosure. Referring to FIGS. 11 and 12, the zoom lens provided by embodiment two of the present disclosure includes a fixed lens group 100 having a positive optical power, a first zoom lens group 200 having a negative optical power, a second zoom lens group 300 having a positive optical power, and a compensation lens group 400 having a positive optical power which are sequentially arranged along an optical axis from an object side to an image side, where the first zoom lens group 200 and the second zoom lens group 300 are capable of reciprocating along the optical axis. The fixed lens group 100 includes a first lens 1, the first zoom lens group 200 includes a second lens 2, a third lens 3, and a fourth lens 4 which are sequentially arranged along the optical axis from the object side to the image side, the second zoom lens group 300 includes a fifth lens 5, a sixth lens 6, a seventh lens 7, an eighth lens 8, a ninth lens 9, a tenth lens 10, and an eleventh lens 11 which are sequentially arranged along the optical axis from the object side to the image side, and the compensation lens group 400 includes a twelfth lens 12, a thirteenth lens 13, and a fourteenth lens 14 which are sequentially arranged along the optical axis from the object side to the image side. The first lens 1 has a positive optical power, the second lens 2 has a negative optical power, the third lens 3 has a negative optical power, the fourth lens 4 has a positive optical power, the fifth lens 5 has a positive optical power, the sixth lens 6 has a negative optical power, the seventh lens 7 has a negative optical power, the eighth lens 8 has a positive optical power, the ninth lens 9 has a negative optical power, the tenth lens 10 has a positive optical power, the eleventh lens 11 has a negative optical power, the twelfth lens 12 has a positive optical power, the thirteenth lens 13 has a positive optical power, and the fourteenth lens 14 has a negative optical power. The seventh lens 7 and the eighth lens 8 form a doublet lens, the ninth lens 9, the tenth lens 10, and the eleventh lens 11 form a triplet lens, and the thirteenth lens 13 and the fourteenth lens 14 form a doublet lens. A diaphragm 500 is located in an optical path between the first zoom lens group 200 and the second zoom lens group 300.

Exemplarily, with a feasible implementation, Table 5 illustrates in detail specific optical physical parameters of each lens in the zoom lens provided by embodiment two of the present disclosure, where the zoom lens in Table 5 corresponds to the zoom lens shown in FIGS. 11 and 12.

TABLE 5

Optical physical parameters of the first lens to the fourteenth lens

| Surface Number | Surface Type | Radius of Curvature | Thickness | Material (nd) | Material (vd) | K Coefficient |
|---|---|---|---|---|---|---|
| 1 | Spherical surface | 36.268 | 2.586 | 1.97 | 28 | |
| 2 | Spherical surface | 51.031 | Variable spacing 1 | | | |
| 3 | Spherical surface | 54.504 | 0.95 | 1.79 | 61.9 | |
| 4 | Spherical surface | 10.027 | 7.126 | | | |
| 5 | Aspheric surface | −19.646 | 0.622 | 1.58 | 55 | 2.161 |
| 6 | Aspheric surface | 22.663 | 0.142 | | | −14.215 |
| 7 | Spherical surface | 22.438 | 4.606 | 1.95 | 17.8 | |

TABLE 5-continued

Optical physical parameters of the first lens to the fourteenth lens

| Surface Number | Surface Type | Radius of Curvature | Thickness | Material (nd) | Material (vd) | K Coefficient |
|---|---|---|---|---|---|---|
| 8 | Spherical surface | 187.703 | Variable spacing 2 | | | |
| STO | PL | INF | Variable spacing 3 | | | |
| 10 | Aspheric surface | 60.664 | 2.118 | 1.62 | 54.4 | 45.293 |
| 11 | Aspheric surface | −30.244 | 1.563 | | | −7.846 |
| 12 | Spherical surface | −12.4 | 1.886 | 1.84 | 49.2 | |
| 13 | Spherical surface | −17.359 | 0.05 | | | |
| 14 | Spherical surface | 35.283 | 0.625 | 1.65 | 42.4 | |
| 15 | Spherical surface | 16.425 | 6.637 | 1.59 | 66.8 | |
| 16 | Spherical surface | −16.513 | 0.13 | | | |
| 17 | Spherical surface | 28.821 | 0.993 | 1.85 | 25.9 | |
| 18 | Spherical surface | 10.614 | 6.33 | 1.59 | 70.3 | |
| 19 | Spherical surface | −15.222 | 1.147 | 2 | 27.3 | |
| 20 | Spherical surface | −28.173 | Variable spacing 4 | | | |
| 21 | Aspheric surface | 35.477 | 1.558 | 1.87 | 32.2 | −38.095 |
| 22 | Aspheric surface | 133.060 | 0.065 | | | 5.201 |
| 23 | Spherical surface | 21.763 | 3.565 | 1.99 | 17.1 | |
| 24 | Spherical surface | −14.751 | 0.771 | 1.84 | 22.7 | |
| 25 | Spherical surface | 11.685 | | | | |

The surface numbers in Table 5 are numbered according to surface orders of each lens. For example, "1" represents an object-side surface of the first lens 1, "2" represents an image-side surface of the first lens 1, and so on. "15" represents a cemented surface between the seventh lens 7 and the eighth lens 8, "18" represents a cemented surface between the ninth lens 9 and the tenth lens 10, "19" represents a cemented surface between the tenth lens 10 and the eleventh lens 11, and "24" represents a cemented surface between the thirteenth lens 13 and the fourteenth lens 14. The radius of curvature represents a curvature degree of a lens surface, where a positive value indicates that the surface is bent toward an image surface, a negative value indicates that the surface is bent toward an object surface, and "PL" indicates that the surface is a plane and has an infinite radius of curvature. The thickness represents the axial distance from the center of a current surface to the center of a next surface. The radius of curvature and the thickness are in a unit of millimeter (mm). The material (nd) represents a refractive index which indicates the capability of a material between the current surface and the next surface to deflect light rays, where a space indicates that air is in a current position, and the refractive index is 1. The material (vd) represents a dispersion coefficient which indicates a dispersion characteristic of the material between the current surface and the next surface for light, where a space indicates that the air is in the current position. A value of K represents a magnitude of a best-fit cone coefficient of the aspheric surface. STO represents a diaphragm.

Design values of the variable spacings in Table 5 are listed in Table 6:

TABLE 6

Design values of the variable spacings of the zoom lens at the wide-angle end and the telephoto end

|  | Wide-angle End | Telephoto End |
| --- | --- | --- |
| Variable spacing 1 | 0.855 | 11.37 |
| Variable spacing 2 | 11.79 | 1.28 |
| Variable spacing 3 | 6.94 | 1.29 |
| Variable spacing 4 | 0.86 | 5.04 |

A shape equation Z of the aspheric surface of the lens satisfies the following condition:

$$z = \frac{cy^2}{1 + \sqrt{1 - (1+k)c^2y^2}} + Ay^4 + By^6 + Cy^8 + Dy^{10} + Ey^{12} + Fy^{14}.$$

In the equation, Z represents a distance (i.e., sag) from a position on the aspheric surface with a height of y to the vertex of the aspheric surface along the optical axis; c=1/R, where R represents a paraxial curvature radius of the lens surface; K is a cone coefficient; and A, B, C, D, E, and F represent high-order aspheric coefficients.

Aspheric coefficients of each lens in the zoom lens provided by embodiment two of the present disclosure are listed in Table 7:

TABLE 7

Design values of aspheric coefficients of each lens in the zoom lens

| Surface Number | A | B | C | D | E | F |
| --- | --- | --- | --- | --- | --- | --- |
| 5 | −2.091E−5 | 8.054E−7 | −1.561E−8 | 1.393E−10 | 7.63E−14 | 0 |
| 6 | 8.507E−5 | −6.866E−7 | −3.062E−9 | 1.009E−10 | 2.433E−14 | 0 |
| 10 | −1.000E−4 | −1.652E−7 | −7.058E−9 | 1.235E−10 | −2.100E−12 | 4.796E−15 |
| 11 | −1.118E−5 | 6.61E−7 | 4.532E−10 | 7.952E−11 | 6.468E−14 | 3.158E−15 |
| 21 | 7.817E−5 | −1.989E−6 | 5.680E−8 | −4.232E−10 | −2.213E−13 | −5.223E−15 |
| 22 | 9.168E−6 | −6.555E−7 | 5.015E−8 | −4.352E−10 | −4.505E−13 | −3.953E−15 |

In Table 7, −2.091E-5 indicates that the coefficient A for the surface with surface number 5 is −2.091*10⁻⁵, and so on.

The zoom lens provided by embodiment two of the present disclosure has the following technical indices:

TABLE 8

Technical indices of the zoom lens

|  | Wide-angle End | Telephoto End |
| --- | --- | --- |
| Aperture | 1.05 | 1.2 |
| Focal length | 4.65 | 10.16 |
| Field of view | 135° | 53° |

Figure 13:
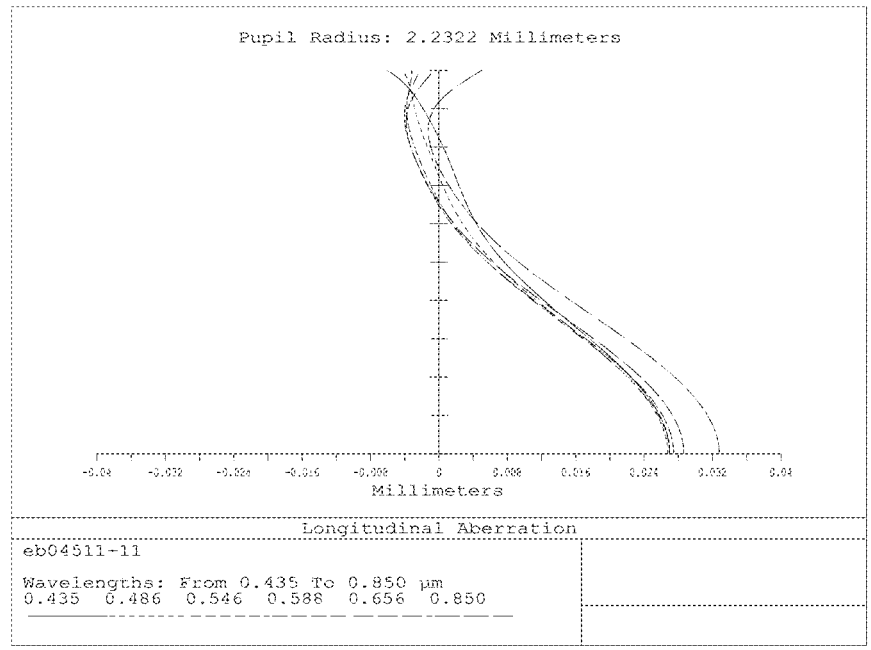
FIG. 13 is a plot showing spherical aberration curves of the zoom lens at the wide-angle end according to embodiment two of the present disclosure.

FIG. 13 is a plot showing spherical aberration curves of the zoom lens at the wide-angle end according to embodiment two of the present disclosure. As shown in FIG. 13, spherical aberrations of the zoom lens at different wavelengths (0.435 μm, 0.486 μm, 0.546 μm, 0.588 μm, 0.656 μm, and 0.850 μm) are within 0.036 mm, and the curves at the different wavelengths are relatively concentrated, which indicates that axial aberrations of the zoom lens are relatively small. Therefore, it can be seen that the zoom lens provided by the embodiment of the present disclosure can better correct the aberrations at the wide-angle end.

Figure 14:
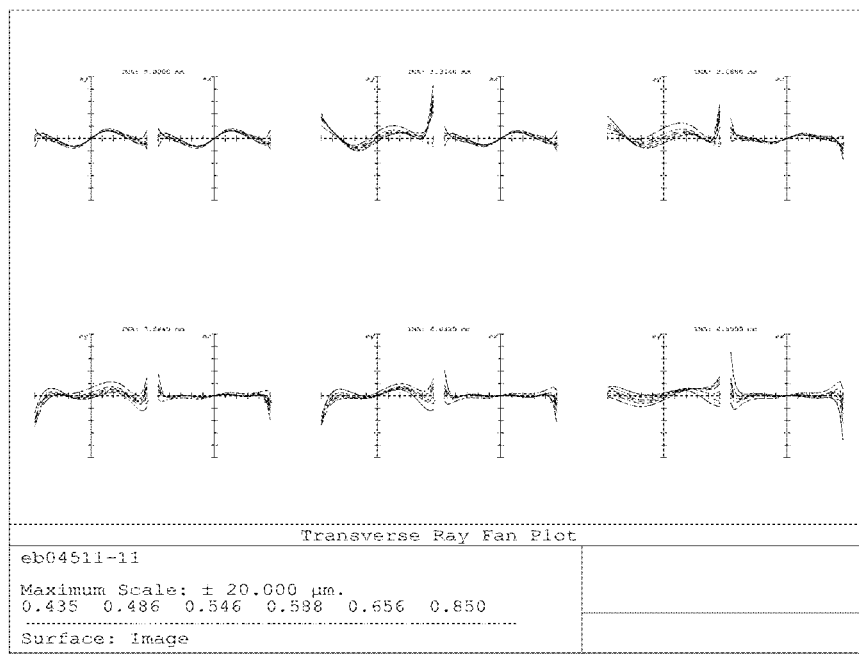
FIG. 14 shows ray fan plots of the zoom lens at the wide-angle end according to embodiment two of the present disclosure.

FIG. 14 shows ray fan plots of the zoom lens at the wide-angle end according to embodiment two of the present disclosure. As shown in FIG. 14, imaging ranges of light rays of different wavelengths (0.435 μm, 0.486 μm, 0.546 μm, 0.588 μm, 0.656 μm, and 0.850 μm) at different fields of view of the zoom lens are within 20 μm, and the curves are very concentrated, which ensures that aberrations in regions at the different fields of view are relatively small, that is, the zoom lens better corrects the aberrations of the optical system at the wide-angle end.

Figure 15:
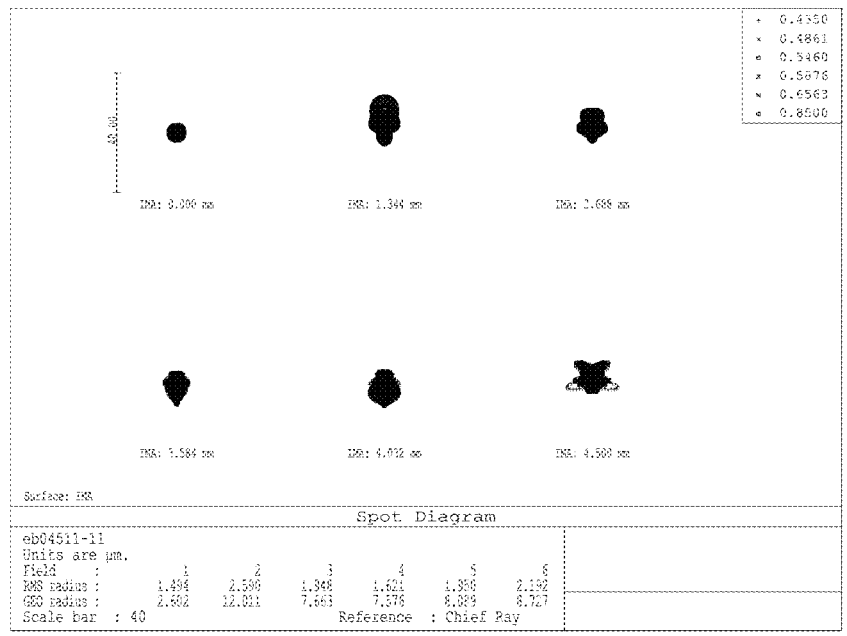
FIG. 15 shows spot diagrams of the zoom lens at the wide-angle end according to embodiment two of the present disclosure.

FIG. 15 shows spot diagrams of the zoom lens at the wide-angle end according to embodiment two of the present disclosure, where a spot diagram is one of the most commonly used evaluation methods in modern optical design. The spot diagram shows that after light rays emitted from a point light source pass through the optical system, intersection points of the light rays and the image surface are no longer concentrated at the same point due to the aberrations, but dispersed in a certain range, thereby forming a dispersion pattern, but dispersed in a certain range, thereby forming a dispersion pattern. As shown in FIG. 15, with the zoom lens provided by the embodiment of the present disclosure, a dispersion pattern of the light rays of different wavelengths (0.435 μm, 0.486 μm, 0.546 μm, 0.588 μm, 0.656 μm, and 0.850 μm) in each field of view is relatively concentrated and uniformly distributed, without a phenomenon that a dispersion pattern at a certain field of view is greatly separated from top to bottom along with the wavelength, which indicates that there is no obvious purple fringing. In addition, RMS radii of the light rays of different wavelengths (0.435 μm, 0.486 μm, 0.546 μm, 0.588 μm, 0.656 μm, and 0.850 μm) at the fields of view of the zoom lens are 1.494 μm, 2.590 μm, 1.948 μm, 1.621 μm, 1.950 μm, and 2.192 μm, respectively, which indicates that the RMS radii at the fields of view are each less than 3 μm, that is, the zoom lens has relatively low chromatic aberrations and relatively low aberrations at the wide-angle end. Thus, the problem of purple fringing of imaging at each waveband is solved and high-resolution imaging can be implemented.

Figure 16:
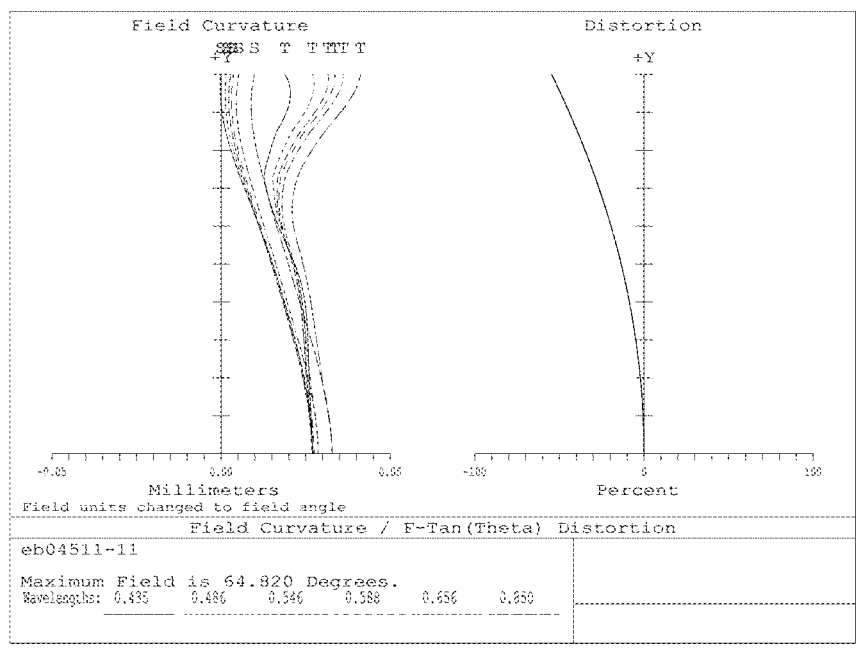
FIG. 16 shows a field curvature plot and a distortion plot of the zoom lens at the wide-angle end according to embodiment two of the present disclosure.

FIG. 16 shows a field curvature plot and a distortion plot of the zoom lens at t wide-angle end according to embodiment two of the present disclosure. As shown in FIG. 16, in the left coordinate system, the abscissa represents a magnitude of field curvature in a unit of millimeter; and the ordinate represents a normalized image height which has no unit, where T represents "meridian" and S represents "sagittal". It can be seen from FIG. 6 that for light with a wavelength of 435 nm to 850 nm, the zoom lens provided by this embodiment is effectively controlled in terms of field curvature. That is, when the imaging is performed, the difference between the image quality at a center and the image quality at a periphery is relatively small. In the right coordinate system, the abscissa represents a magnitude of the distortion in a unit of percentage; and the ordinate represents a normalized image height which has no unit. It can be seen from FIG. 16 that the distortion of the zoom lens provided by this embodiment at the wide-angle end is better corrected, so that the imaging distortion is relatively small, which satisfies the requirement for low distortions.

Figure 17:
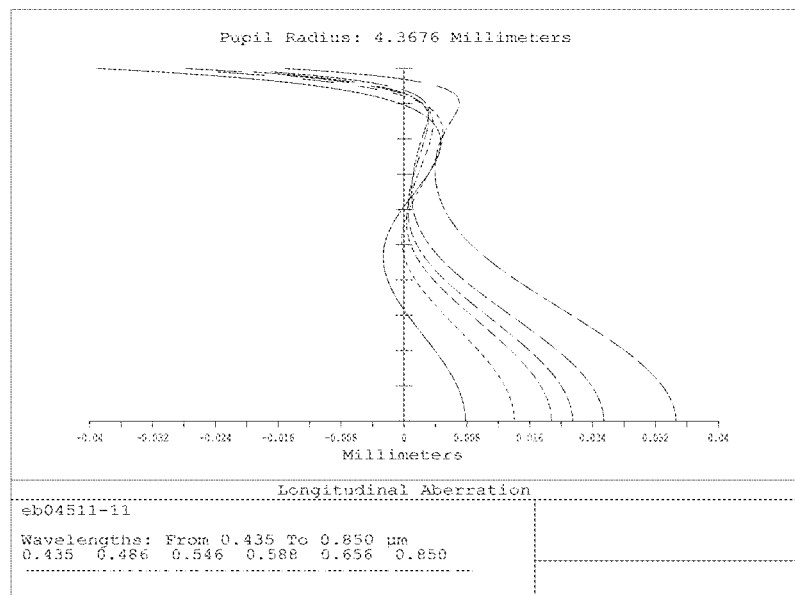
FIG. 17 is a plot showing spherical aberration curves of the zoom lens at the telephoto end according to embodiment two of the present disclosure.

FIG. 17 is a plot showing spherical aberration curves of the zoom lens at the telephoto end according to embodiment two of the present disclosure. As shown in FIG. 17, spherical aberrations of the zoom lens at the different wavelengths (0.435 μm, 0.486 μm, 0.546 μm, 0.588 μm, 0.656 μm, and 0.850 μm) are within 0.036 mm, and the curves at the different wavelengths are relatively concentrated, which indicates that axial aberrations of the zoom lens are relatively small. Therefore, it can be seen that the zoom lens provided by the embodiment of the present disclosure can better correct the aberrations at the telephoto end.

Figure 18:
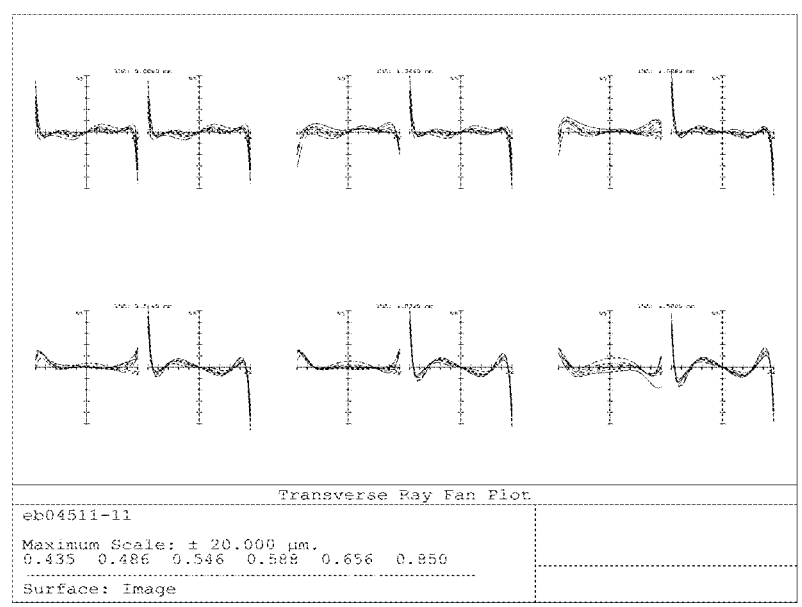
FIG. 18 shows ray fan plots of the zoom lens at the telephoto end according to embodiment two of the present disclosure.

FIG. 18 shows ray fan plots of the zoom lens at the telephoto end according to embodiment two of the present disclosure. As shown in FIG. 18, imaging ranges of the light rays of different wavelengths (0.435 μm, 0.486 μm, 0.546 μm, 0.588 μm, 0.656 μm, and 0.850 μm) at the different fields of view of the zoom lens are within 20 μm, and the curves are very concentrated, which ensures that aberrations in the regions at the different fields of view are relatively small, that is, the zoom lens better corrects the aberrations of the optical system at the telephoto end.

Figure 19:
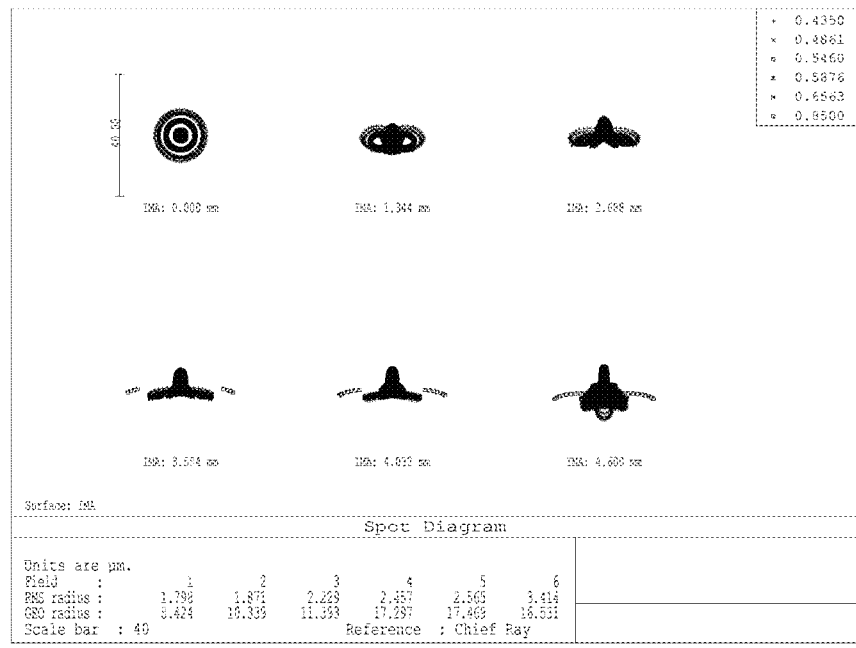
FIG. 19 shows spot diagrams of the zoom lens at the telephoto end according to embodiment two of the present disclosure.

FIG. 19 shows spot diagrams of the zoom lens at the telephoto end according to embodiment two of the present disclosure. As shown in FIG. 19, with the zoom lens provided by the embodiment of the present disclosure, a dispersion pattern of the light rays of different wavelengths (0.435 μm, 0.486 μm, 0.546 μm, 0.588 μm, 0.656 μm, and 0.850 μm) in each field of view is relatively concentrated and uniformly distributed, without a phenomenon that a dispersion pattern at a certain field of view is greatly separated from top to bottom along with the wavelength, which indicates that there is no obvious purple fringing. In addition, RMS radii of the light rays of different wavelengths (0.435 μm, 0.486 μm, 0.546 μm, 0.588 μm, 0.656 μm, and 0.850 μm) at the fields of view of the zoom lens are 1.798 μm, 1.871 μm, 2.229 μm, 2.457 μm, 2.565 μm, and 3.414 μm, respectively, which indicates that the RMS radii at the fields of view are each less than 4 μm, that is, the zoom lens has relatively low chromatic aberrations and relatively low aberrations at the telephoto end. Thus, the problem of the purple fringing of the imaging at each waveband is solved and the high-resolution imaging can be implemented.

Figure 20:
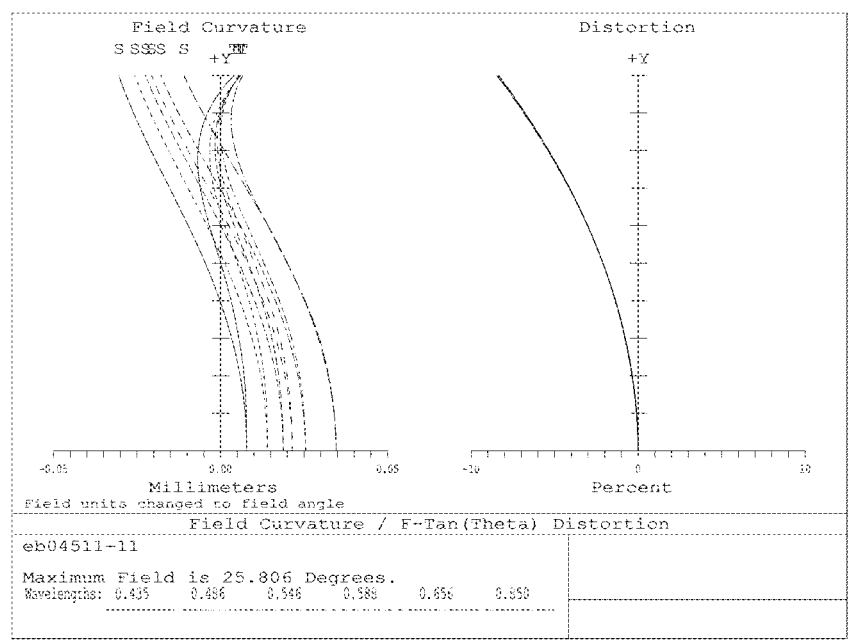
FIG. 20 shows a field curvature plot and a distortion plot of the zoom lens at the telephoto end according to embodiment two of the present disclosure.

FIG. 20 shows a field curvature plot and a distortion plot of the zoom lens at the telephoto end according to embodiment two of the present disclosure. As shown in FIG. 20, in the left coordinate system, the abscissa represent a magnitude of field curvature in a unit of millimeter; and the ordinate represents a normalized image height which has no unit, where T represents "meridian" and S represents "sagittal". It can be seen from FIG. 20 that for light rays with the wavelengths of 435 nm to 850 nm, the zoom lens provided by this embodiment is effectively controlled in terms of field curvature. That is, when the imaging is performed, the difference between the image quality at a center and the image quality at a periphery is relatively small. In the right coordinate system, the abscissa represents a magnitude of the distortion in a unit of percentage; and the ordinate represents a normalized image height which has no unit. It can be seen from FIG. 20 that the distortion of the zoom lens provided by this embodiment at the wide-angle end is better corrected, so that the imaging distortion is relatively small, which satisfies the requirement for low distortions.

Embodiment Three

Figure 21:
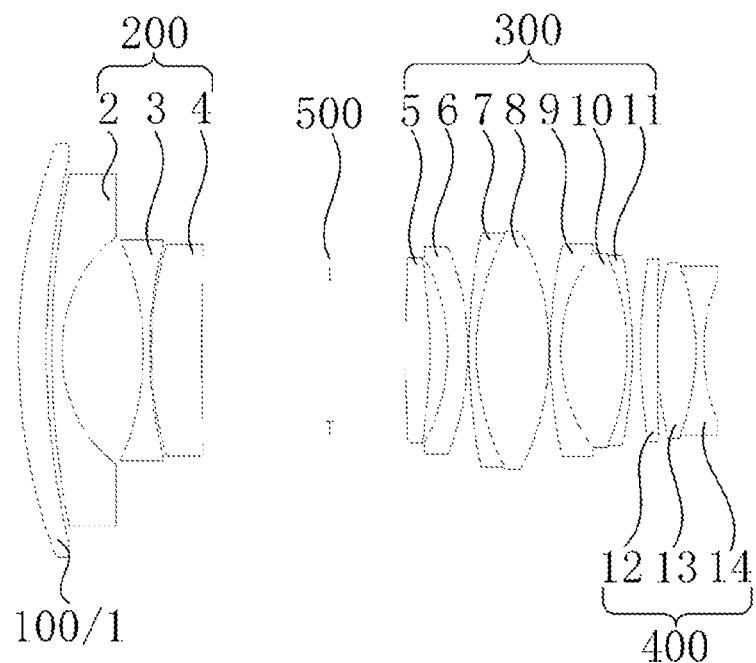
FIG. 21 is a structure view of a zoom lens at a wide-angle end according to embodiment three of the present disclosure.
Figure 22:
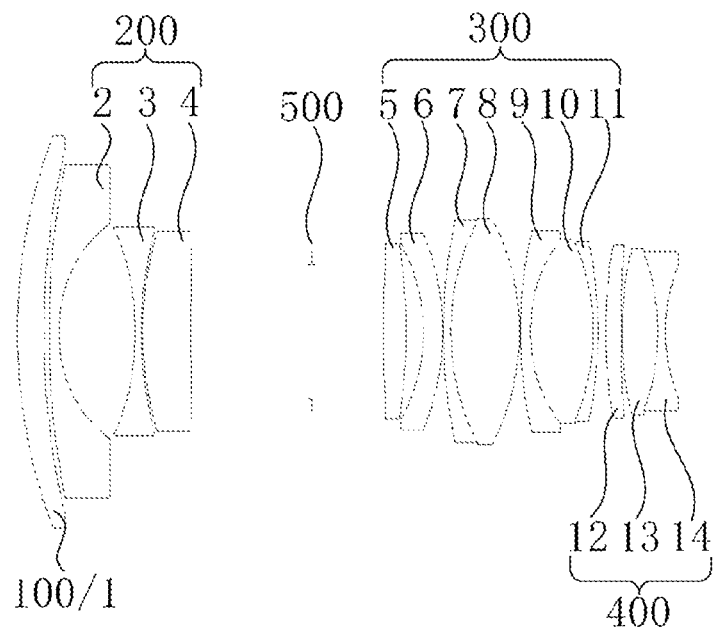
FIG. 22 is a structure view of the zoom lens at a telephoto end according to embodiment three of the present disclosure.

FIG. 21 is a structure view of a zoom lens at a wide-angle end according to embodiment three of the present disclosure; and FIG. 22 is a structure view of the zoom lens at a telephoto end according to embodiment three of the present disclosure. Referring to FIGS. 21 and 22, the zoom lens provided by embodiment three of the present disclosure provides includes a fixed lens group 100 having a positive optical power, a first zoom lens group 200 having a negative optical power, a second zoom lens group 300 having a positive optical power, and a compensation lens group 400 having a positive optical power which are sequentially arranged along an optical axis from an object side to an image side, where the first zoom lens group 200 and the second zoom lens group 300 are capable of reciprocating along the optical axis. The fixed lens group 100 includes a first lens 1, the first zoom lens group 200 includes a second lens 2, a third lens 3, and a fourth lens 4 which are sequentially arranged along the optical axis from the object side to the image side, the second zoom lens group 300 includes a fifth lens 5, a sixth lens 6, a seventh lens 7, an eighth lens 8, a ninth lens 9, a tenth lens 10, and an eleventh lens 11 which are sequentially arranged along the optical axis from the object side to the image side, and the compensation lens group 400 includes a twelfth lens 12, a thirteenth lens 13, and a fourteenth lens 14 which are sequentially arranged along the optical axis from the object side to the image side. The first lens 1 has a positive optical power, the second lens 2 has a negative optical power, the third lens 3 has a negative optical power, the fourth lens 4 has a positive optical power, the fifth lens 5 has a positive optical power, the sixth lens 6 has a negative optical power, the seventh lens 7 has a negative optical power, the eighth lens 8 has a positive optical power, the ninth lens 9 has a negative optical power, the tenth lens 10 has a positive optical power, the eleventh lens 11 has a negative optical power, the twelfth lens 12 has a positive optical power, the thirteenth lens 13 has a positive optical power, and the fourteenth lens 14 has a negative optical power. The seventh lens 7 and the eighth lens 8 form a doublet lens, the ninth lens 9, the tenth lens 10, and the eleventh lens 11 form a triplet lens, and the thirteenth lens 13 and the fourteenth lens 14 form a doublet lens. A diaphragm 500 is located in an optical path between the first zoom lens group 200 and the second zoom lens group 300.

Exemplarily, with a feasible implementation, Table 9 illustrates in detail specific optical physical parameters of each lens in the zoom lens provided by embodiment three of the present disclosure, where the zoom lens in Table 9 corresponds to the zoom lens shown in FIGS. 21 and 22.

TABLE 9

Optical physical parameters of the first lens to the fourteenth lens

| Surface Number | Surface Type | Radius of Curvature | Thickness | Material (nd) | Material (vd) | K Coefficient |
|---|---|---|---|---|---|---|
| 1 | Spherical surface | 36.737 | 2.586 | 1.86 | 27.2 | |
| 2 | Spherical surface | 52.021 | Variable spacing 1 | | | |

TABLE 9-continued

Optical physical parameters of the first lens to the fourteenth lens

| Surface Number | Surface Type | Radius of Curvature | Thickness | Material (nd) | Material (vd) | K Coefficient |
|---|---|---|---|---|---|---|
| 3 | Spherical surface | 55.471 | 0.95 | 1.73 | 56 | |
| 4 | Spherical surface | 9.861 | 7.453 | | | |
| 5 | Aspheric surface | −19.547 | 0.576 | 1.59 | 72.7 | 2.379 |
| 6 | Aspheric surface | 22.331 | 0.156 | | | −14.219 |
| 7 | Spherical surface | 22.513 | 4.679 | 1.95 | 20.4 | |
| 8 | Spherical surface | 187.703 | Variable spacing 2 | | | |
| STO | PL | INF | Variable spacing 3 | | | |
| 10 | Aspheric surface | 60.786 | 2.234 | 1.61 | 61.9 | 44.945 |
| 11 | Aspheric surface | −30.147 | 1.651 | | | −8.778 |
| 12 | Spherical surface | −12.306 | 1.87 | 1.6 | 44 | |
| 13 | Spherical surface | −17.454 | 0.098 | | | |
| 14 | Spherical surface | 35.273 | 0.701 | 1.66 | 40 | |
| 15 | Spherical surface | 16.263 | 6.689 | 1.59 | 65.6 | |
| 16 | Spherical surface | −16.535 | 0.086 | | | |
| 17 | Spherical surface | 28.876 | 0.985 | 1.85 | 26 | |
| 18 | Spherical surface | 10.559 | 6.102 | 1.59 | 60.1 | |
| 19 | Spherical surface | −15.316 | 0.5 | 2 | 25.9 | |
| 20 | Spherical surface | −28.063 | Variable spacing 4 | | | |
| 21 | Aspheric surface | 35.61 | 1.5 | 1.84 | 36.7 | −38.897 |
| 22 | Aspheric surface | 152.019 | 0.046 | | | 0.455 |
| 23 | Spherical surface | 22.528 | 3.519 | 1.99 | 17.4 | |
| 24 | Spherical surface | −15.152 | 0.75 | 1.85 | 22.9 | |
| 25 | Spherical surface | 11.643 | | | | |

The surface numbers in Table 9 are numbered according to surface orders of each lens. For example, "1" represents an object-side surface of the first lens 1, "2" represents an image-side surface of the first lens 1, and so on. "15" represents a cemented surface between the seventh lens 7 and the eighth lens 8, "18" represents a cemented surface between the ninth lens 9 and the tenth lens 10, "19" represents a cemented surface between the tenth lens 10 and the eleventh lens 11, and "24" represents a cemented surface between the thirteenth lens 13 and the fourteenth lens 14. The radius of curvature represents a curvature degree of a lens surface, where a positive value indicates that the surface is bent toward an image surface, a negative value indicates that the surface is bent toward an object surface, and "PL" indicates that the surface is a plane and has an infinite radius of curvature. The thickness represents the axial distance from the center of a current surface to the center of a next surface. The radius of curvature and the thickness are in a unit of millimeter (mm). The material (nd) represents a refractive index which indicates the capability of a material between the current surface and the next surface to deflect light rays, where a space indicates that air is in a current position, and the refractive index is 1. The material (vd) represents a dispersion coefficient which indicates a dispersion characteristic of the material between the current surface and the next surface for light, where a space indicates that the air is in the current position. A value of K represents a magnitude of a best-fit cone coefficient of the aspheric surface. STO represents a diaphragm.

Design values of the variable spacings in Table 9 are listed in Table 10:

TABLE 10

Design values of the variable spacings of the zoom lens at the wide-angle end and the telephoto end

| | Wide-angle End | Telephoto End |
|---|---|---|
| Variable spacing 1 | 0.5 | 11.45 |
| Variable spacing 2 | 11.79 | 0.83 |
| Variable spacing 3 | 7 | 1.47 |
| Variable spacing 4 | 0.77 | 4.95 |

A shape equation Z of the aspheric surface of the lens satisfies the following condition:

$$z = \frac{cy^2}{1+\sqrt{1-(1+k)c^2y^2}} + Ay^4 + By^6 + Cy^8 + Dy^{10} + Ey^{12} + Fy^{14}.$$

In the equation, Z represents a distance (sag) from a position on the aspheric surface with a height of y to the vertex of the aspheric surface along the optical axis; c=1/R, where R represents a paraxial curvature radius of the lens surface; K is a cone coefficient; and A, B, C, D, E, and F represent high-order aspheric coefficients.

Aspheric coefficients of each lens in the zoom lens provided by embodiment three of the present disclosure are listed in Table 11:

TABLE 11

Design values of aspheric coefficients of each lens in the zoom lens

| Surface Number | A | B | C | D | E | F |
|---|---|---|---|---|---|---|
| 5 | −2.035E−5 | 8.625E−7 | −1.608E−8 | 1.493E−10 | 1.102E−13 | 0 |
| 6 | 8.332E−5 | −7.115E−7 | −3.879E−9 | 1.118E−10 | 5.484E−14 | 0 |
| 10 | −1.024E−4 | −1.859E−7 | −6.990E−9 | 1.235E−10 | −1.965E−12 | 7.521E−15 |
| 11 | −1.048E−5 | 6.374E−7 | 3.106E−10 | 7.767E−11 | 5.367E−14 | 4.681E−15 |
| 21 | 7.966E−5 | −1.993E−6 | 5.688E−8 | −4.139E−10 | −1.456E−13 | −7.53E−16 |
| 22 | 9.000E−6 | −6.529E−7 | 4.998E−8 | −4.389E−10 | −2.623E−13 | −1.231E−15 |

In Table 11, −2.035E-5 indicates that the coefficient A for the surface with surface number 5 is −2.035*10⁻⁵, and so on.

The zoom lens provided by embodiment three of the present disclosure has the following technical indices:

TABLE 12

Technical indices of the zoom lens

|  | Wide-angle End | Telephoto End |
| --- | --- | --- |
| Aperture | 1.07 | 1.19 |
| Focal length | 4.65 | 10.14 |
| Field of view | 135° | 52° |

Figure 23:
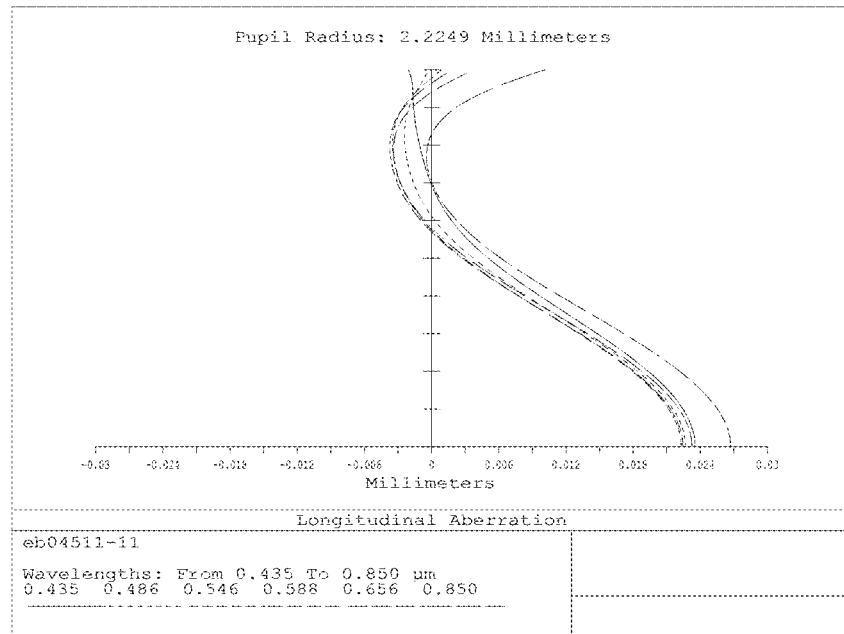
FIG. 23 is a plot showing spherical aberration curves of the zoom lens at the wide-angle end according to embodiment three of the present disclosure.

FIG. 23 is a plot showing spherical aberration curves of the zoom lens at the wide-angle end according to embodiment three of the present disclosure. As shown in FIG. 23, spherical aberrations of the zoom lens at different wavelengths (0.435 μm, 0.486 μm, 0.546 μm, 0.588 μm, 0.656 μm, and 0.850 μm) are within 0.027 mm, and the curves at the different wavelengths are relatively concentrated, which indicates that axial aberrations of the zoom lens are relatively small. Therefore, it can be seen that the zoom lens provided by the embodiment of the present disclosure can better correct the aberrations at the wide-angle end.

Figure 24:
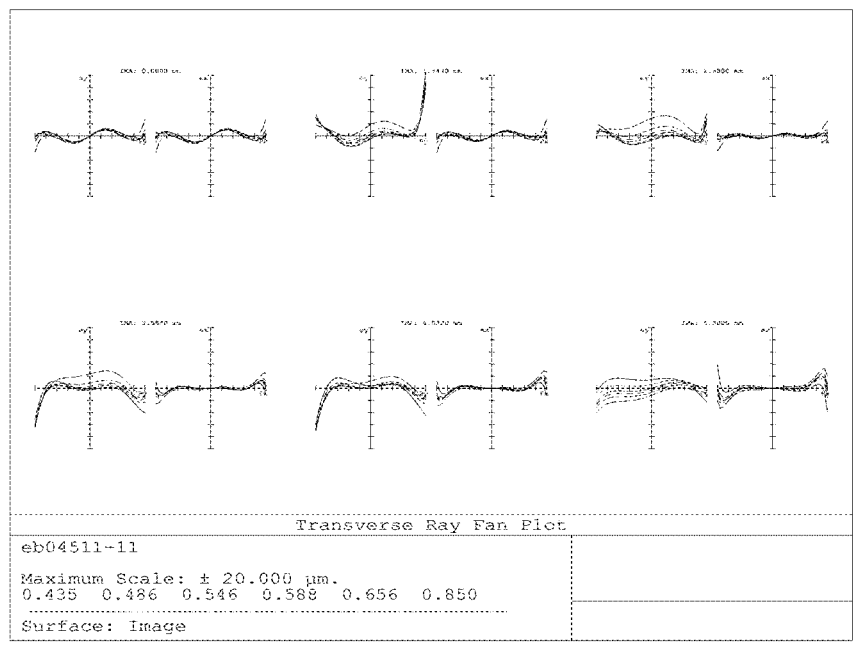
FIG. 24 shows ray fan plots of the zoom lens at the wide-angle end according to embodiment three of the present disclosure.

FIG. 24 shows ray fan plots of the zoom lens at the wide-angle end according to embodiment three of the present disclosure. As shown in FIG. 24, imaging ranges of light rays of different wavelengths (0.435 μm, 0.486 μm, 0.546 μm, 0.588 μm, 0.656 μm, and 0.850 μm) at different fields of view of the zoom lens are within 20 μm, and the curves are very concentrated, which ensures that aberrations in regions at the different fields of view are relatively small, that is, the zoom lens better corrects the aberrations of the optical system at the wide-angle end.

Figure 25:
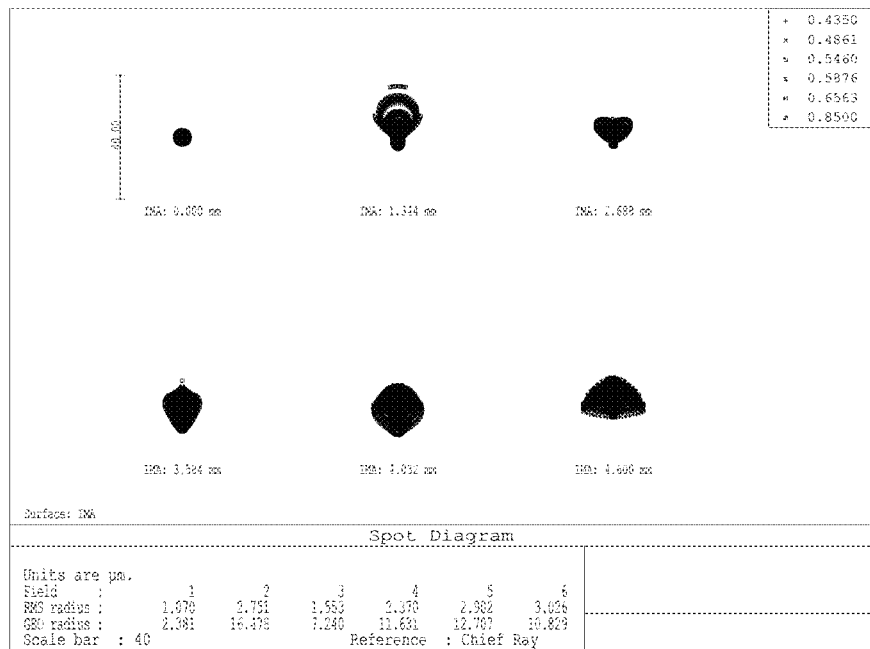
FIG. 25 shows spot diagrams of the zoom lens at the wide-angle end according to embodiment three of the present disclosure.

FIG. 25 shows spot diagrams of the zoom lens at the wide-angle end according to embodiment three of the present disclosure, where a spot diagram is one of the most commonly used evaluation methods in modern optical design. The spot diagram shows after light rays emitted from a point light source pass through the optical system, intersection points of the light rays and the image surface are no longer concentrated at the same point due to the aberrations, but dispersed in a certain range, thereby forming a dispersion pattern. As shown in FIG. 25, with the zoom lens provided by the embodiment of the present disclosure, a dispersion pattern of the light rays of different wavelengths (0.435 μm, 0.486 μm, 0.546 μm, 0.588 μm, 0.656 μm, and 0.850 μm) in each field of view is relatively concentrated and uniformly distributed, without a phenomenon that a dispersion pattern at a certain field of view is greatly separated from top to bottom along with the wavelength, which indicates that there is no obvious purple fringing. In addition, RMS radii of the light rays of different wavelengths (0.435 μm, 0.486 μm, 0.546 μm, 0.588 μm, 0.656 μm, and 0.850 μm) at the fields of view of the zoom lens are 1.070 μm, 2.751 μm, 1.553 μm, 2.370 μm, 2.902 μm, and 3.026 μm, respectively, which indicates that the RMS radii at the fields of view are each less than 4 μm, that is, the zoom lens has relatively low chromatic aberrations and relatively low aberrations at the wide-angle end. Thus, the problem of purple fringing of imaging at each waveband is solved and high-resolution imaging can be implemented.

Figure 26:
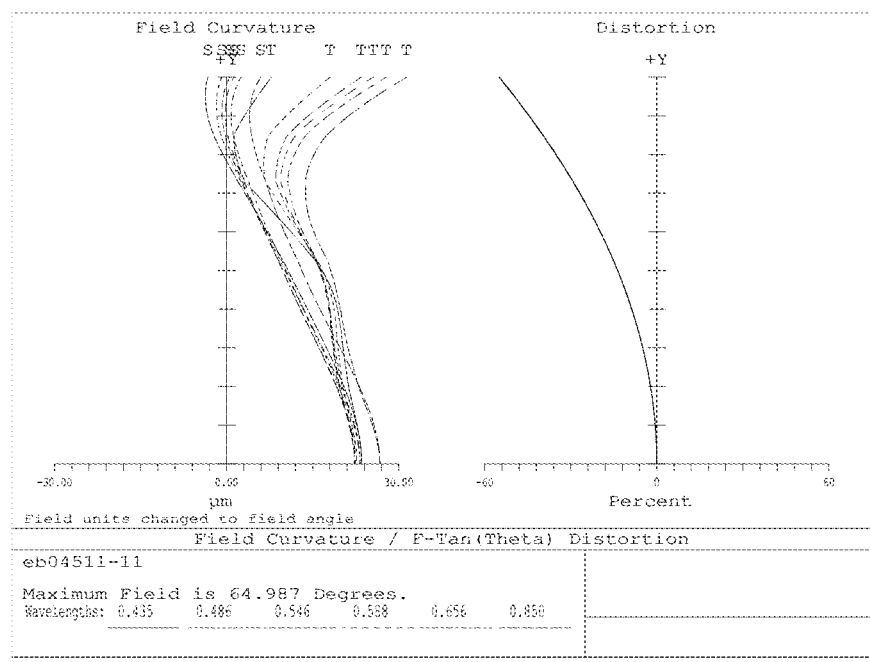
FIG. 26 shows a field curvature plot and a distortion plot of the zoom lens at the wide-angle end according to embodiment three of the present disclosure.

FIG. 26 shows a field curvature plot and a distortion plot of the zoom lens at the wide-angle end according to embodiment three of the present disclosure. As shown in FIG. 26, in the left coordinate system, the abscissa represents magnitudes of field curvature in a unit of millimeter; and the ordinate represents a normalized image height which has no unit, where T represents "meridian" and S represents "sagittal". It can be seen from FIG. 26 for light with a wavelength of 435 nm to 850 nm, the zoom lens provided by this embodiment is effectively controlled in terms of field curvature. That is, when the imaging is performed, the difference between the image quality at a center and the image quality at a periphery is relatively small. In the right coordinate system, the abscissa represent a magnitude of the distortion in a unit of percentage; and the ordinate represents a normalized image height which has no unit. It can be seen from FIG. 26 that the distortion of the zoom lens provided by this embodiment at the wide-angle end is better corrected, so that the imaging distortion is relatively small, which satisfies the requirement for low distortions.

Figure 27:
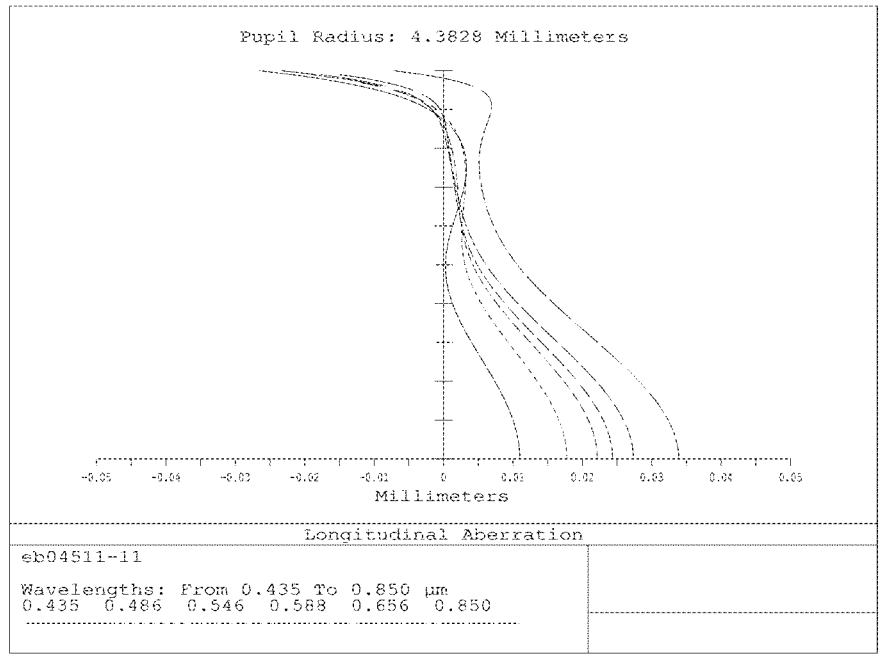
FIG. 27 is a plot showing spherical aberration curves of the zoom lens at the telephoto end according to embodiment three of the present disclosure.

FIG. 27 is a plot showing spherical aberration curves of the zoom lens at the telephoto end according to embodiment three of the present disclosure. As shown in FIG. 27, spherical aberrations of the zoom lens at the different wavelengths (0.435 μm, 0.486 μm, 0.546 μm, 0.588 μm, 0.656 μm, and 0.850 μm) are within 0.035 mm, and the curves at the different wavelengths are relatively concentrated, which indicates that axial aberrations of the zoom lens are relatively small. Therefore, it can be seen that the zoom lens provided by the embodiment of the present disclosure can better correct the aberrations at the telephoto end.

Figure 28:
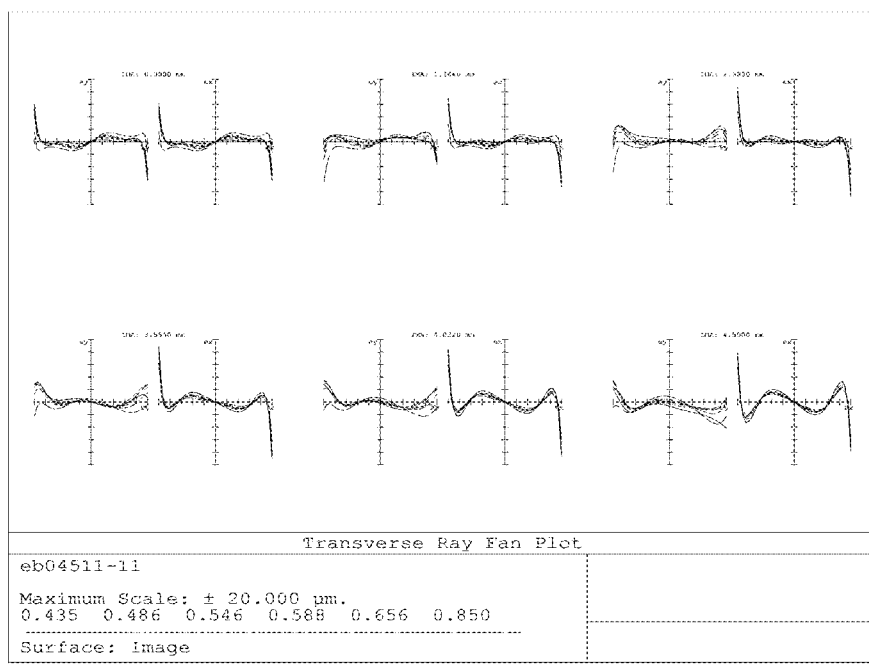
FIG. 28 shows ray fan plots of the zoom lens at the telephoto end according to embodiment three of the present disclosure.

FIG. 28 shows ray fan plots of the zoom lens at the telephoto end according to embodiment three of the present disclosure. As shown in FIG. 28, imaging ranges of the light rays of different wavelengths (0.435 μm, 0.486 μm, 0.546 μm, 0.588 μm, 0.656 μm, and 0.850 μm) at the different fields of view of the zoom lens are within 20 μm, and the curves are very concentrated, which ensures that aberrations in the regions at the different fields of view are relatively small, that is, the zoom lens better corrects the aberrations of the optical system at the telephoto end.

Figure 29:
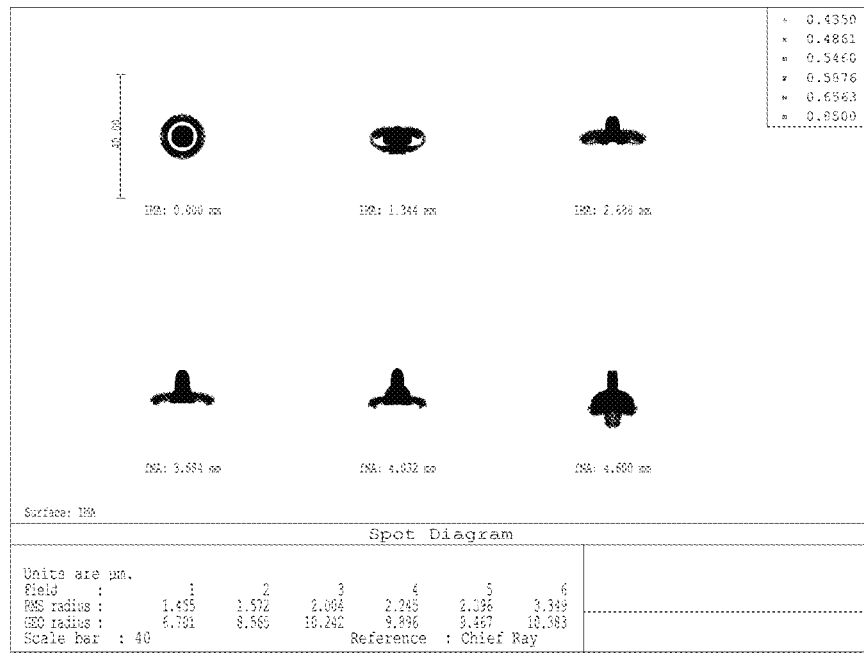
FIG. 29 shows spot diagrams of the zoom lens at the telephoto end according to embodiment three of the present disclosure.

FIG. 29 shows spot diagrams of the zoom lens at the telephoto end according to embodiment three of the present disclosure. As shown in FIG. 29, with the zoom lens provided by the embodiment of the present disclosure, a dispersion patttern of the light rays of different wavelengths (0.435 μm, 0.486 μm, 0.546 μm, 0.588 μm, 0.656 μm, and 0.850 μm) in each field of view is relatively concentrated and uniformly distributed, without a phenomenon that a dispersion pattern at a certain field of view is greatly separated from top to bottom along with the wavelength, which indicates that there is no obvious purple fringing. In addition, RMS radii of the light rays of different wavelengths (0.435 μm, 0.486 μm, 0.546 μm, 0.588 μm, 0.656 μm, and 0.850 μm) at the fields of view of the zoom lens are 1.455 μm, 1.572 μm, 2.004 μm, 2.245 μm, 2.396 μm, and 3.349 μm, respectively, which indicates that the RMS radii at the fields of view are each less than 4 μm, that is, the zoom lens has relatively low chromatic aberrations and relatively low aberrations at the telephoto end. Thus, the problem of the purple fringing of the imaging at each waveband is solved and the high-resolution imaging can be implemented.

Figure 30:
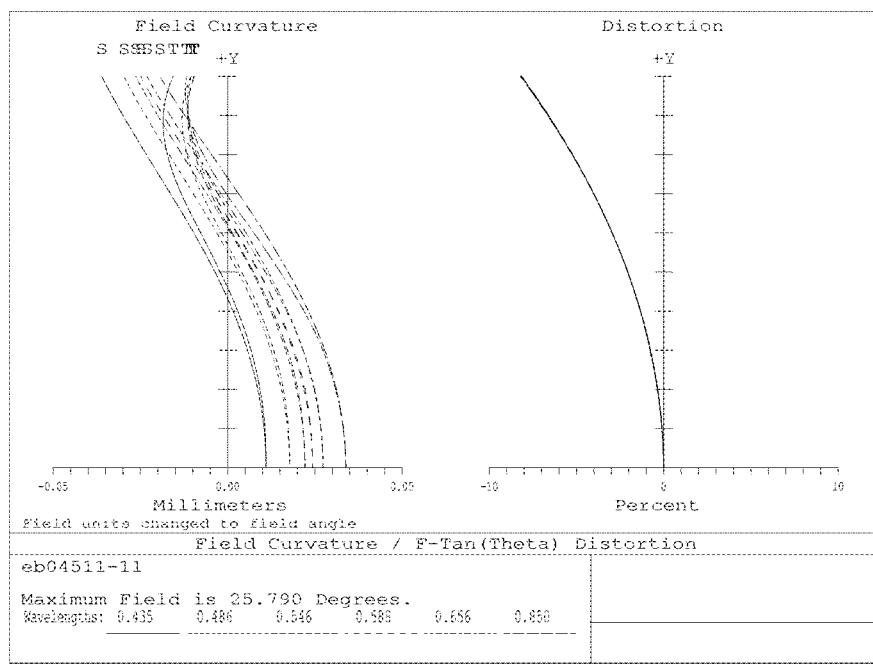
FIG. 30 shows a field curvature plot and a distortion plot of the zoom lens at the telephoto end according to embodiment three of the present disclosure.

FIG. 30 shows a field curvature plot and a distortion plot of the zoom lens at the telephoto end according to embodiment three of the present disclosure. As shown in FIG. 30, in the left coordinate system, the abscissa represents a magnitude of field curvature in a unit of millimeter; and the ordinate represents a normalized image height which has no unit, where T represents "meridian" and S represents "sagittal". It can be seen from FIG. 30 that for light rays with the wavelengths of 435 nm to 850 nm, the zoom lens provided by this embodiment is effectively controlled in terms of field curvature. That is, when the imaging is performed, the difference between the image quality at a center and the image quality at a periphery is relatively small. In the right coordinate system, the abscissa represents a magnitude of the distortion in a unit of percentage; and the ordinate represents a normalized image height which has no unit. It can be seen from FIG. 30 that the distortion of the zoom lens provided by this embodiment at the telephoto end is better corrected, so that the imaging distortion is relatively small, which satisfies the requirement for low distortions.

It is to be noted that the above are merely preferred embodiments of the present disclosure and the principles used therein. It is to be understood by those skilled in the art that the present disclosure is not limited to the embodiments described herein. Those skilled in the art can make various apparent changes, adaptations, combinations, and substitutions without departing from the scope of the present disclosure. Therefore, although the present disclosure has been described in detail through the preceding embodiments, the present disclosure is not limited to the preceding embodiments and may include more other equivalent embodiments without departing from the concept of the present disclosure. The scope of the present disclosure is determined by the scope of the appended claims.

What is claimed is:

1. A zoom lens, comprising: a fixed lens group having a positive optical power, a first zoom lens group having a negative optical power, a second zoom lens group having a positive optical power, and a compensation lens group having a positive optical power which are sequentially arranged along an optical axis from an object side to an image side, wherein the first zoom lens group and the second zoom lens group are capable of reciprocating along the optical axis;

wherein the fixed lens group comprises a first lens, the first zoom lens group comprises a second lens, a third lens, and a fourth lens which are sequentially arranged along the optical axis from the object side to the image side, the second zoom lens group comprises a fifth lens, a sixth lens, a seventh lens, an eighth lens, a ninth lens, a tenth lens, and an eleventh lens which are sequentially arranged along the optical axis from the object side to the image side, and the compensation lens group comprises a twelfth lens, a thirteenth lens, and a fourteenth lens which are sequentially arranged along the optical axis from the object side to the image side;

wherein optical powers of the second lens to the fourteenth lens satisfy the following conditions:

$0.3 \leq |\varphi 2/Z1| \leq 2.1; 0.3 \leq |\varphi 3/Z1| \leq 2.0; 0.15 \leq |\varphi 4/Z1| \leq 1.5;$ $0.15 \leq |\varphi 5/Z2| \leq 1.5; 0.05 \leq |\varphi 6/Z2| \leq 0.8; 0.08 \leq |\varphi 7/Z2| \leq 1;$ $0.35 \leq |\varphi 8/Z2| \leq 2.5; 0.25 \leq |\varphi 9/Z2| \leq 2.2; 0.4 \leq |\varphi 10/Z2| \leq 3.9;$ $0.05 \leq |\varphi 11/Z2| \leq 0.85; 0.8 \leq |\varphi 12/B| \leq 5.5; 3.5 \leq |\varphi 13/B| \leq 55;$ and $4 \leq |\varphi 14/B| \leq 45$, and wherein φ2 represents an optical power of the second lens, φ3 represents an optical power of the third lens, φ4 represents an optical power of the fourth lens, φ5 represents an optical power of the fifth lens, φ6 represents an optical power of the sixth lens, φ7 represents an optical power of the seventh lens, φ8 represents an optical power of the eighth lens, φ9 represents an optical power of the ninth lens, φ10 represents an optical power of the tenth lens, φ11 represents an optical power of the eleventh lens, φ12 represents an optical power of the twelfth lens, φ13 represents an optical power of the thirteenth lens, φ14 represents an optical power of the fourteenth lens, Z1 represents an optical power of the first zoom lens group, Z2 represents an optical power of the second zoom lens group, and B represents an optical power of the compensation lens group.

2. The zoom lens according to claim 1, wherein, an optical power G of the fixed lens group and an optical power B of the compensation lens group satisfy the following condition: $0.2 \leq |G/B| \leq 2.5$;

an optical power Z1 of the first zoom lens group and the optical power B of the compensation lens group satisfy the following condition: $3 \leq |Z1/B| \leq 30$; and an optical power Z2 of the second zoom lens group and the optical power B of the compensation lens group satisfy the following condition: $2 \leq |Z2/B| \leq 25$.

3. The zoom lens according to claim 1, wherein the first lens has a positive optical power, the second lens has a negative optical power, the third lens has a negative optical power, the fourth lens has a positive optical power, the fifth lens has a positive optical power, the sixth lens has a negative optical power, the seventh lens has a negative optical power, the eighth lens has a positive optical power, the ninth lens has a negative optical power, the tenth lens has a positive optical power, the eleventh lens has a negative optical power, the twelfth lens has a positive optical power, the thirteenth lens has a positive optical power, and the fourteenth lens has a negative optical power.

4. The zoom lens according to claim 1, wherein the refractive indices of the first lens to the fourteenth lens satisfy following conditions:

$1.6 \leq n1 \leq 2.15; 1.58 \leq n2 \leq 1.95; 1.43 \leq n3 \leq 1.75;$
$1.71 \leq n4 \leq 2.15;$ $1.4 \leq n5 \leq 1.75; 1.55 \leq n6 \leq 1.95; 1.55 \leq n7 \leq 1.95;$
$1.4 \leq n8 \leq 1.75;$ $1.65 \leq n9 \leq 2.15; 1.4 \leq n10 \leq 1.75; 1.7 \leq n11 \leq 2.15;$
$1.65 \leq n12 \leq 2.15;$ $1.7 \leq n13 \leq 2.15;$ and $1.65 \leq n14 \leq 2.1$, wherein n1 represents a refractive index of the first lens, n2 represents a refractive index of the second lens, n3 represents a refractive index of the third lens, n4 represents a refractive index of the fourth lens, n5 represents a refractive index of the fifth lens, n6 represents a refractive index of the sixth lens, n7 represents a refractive index of the seventh lens, n8 represents a refractive index of the eighth lens, n9 represents a refractive index of the ninth lens, n10 represents a refractive index of the tenth lens, n11 represents a refractive index of the eleventh lens, n12 represents a refractive index of the twelfth lens, n13 represents a refractive index of the thirteenth lens, and n14 represents a refractive index of the fourteenth lens.

5. The zoom lens according to claim 1, wherein the seventh lens and the eighth lens form a doublet lens, the ninth lens, the tenth lens, and the eleventh lens form a triplet lens, and the thirteenth lens and the fourteenth lens form a doublet lens.

6. The zoom lens according to claim 1, wherein the first lens, the second lens, the fourth lens, the sixth lens, the seventh lens, the eighth lens, the ninth lens, the tenth lens, the eleventh lens, the thirteenth lens, and the fourteenth lens are spherical lenses, and the third lens, the fifth lens, and the twelfth lens are aspheric lenses.

7. The zoom lens according to claim 1, wherein a field of view of the zoom lens satisfies the following condition: $90° \leq$ FOV-w; FOV-t$\leq 65°$;

wherein FOV-w represents a field of view of the zoom lens at a wide-angle end, and FOV-t represents a field of view of the zoom lens at a telephoto end.

8. The zoom lens according to claim 1, wherein an image circle diameter IC of the zoom lens and a total track length TTL of the zoom lens satisfy the following condition: $0.02 \leq$ IC/TTL$\leq 1.2$.

* * * * *